United States Patent [19]

Baror et al.

[11] Patent Number: 5,438,670

[45] Date of Patent: Aug. 1, 1995

[54] METHOD OF PRECHECKING THE VALIDITY OF A WRITE ACCESS REQUEST

[75] Inventors: Gigi Baror, Austin, Tex.; Moti Beck, Tel Aviv; Dan Biran, Tel Aviv; Elliot Cohen, Tel Aviv; Yair Hadas, Tel Aviv; Benny Konstantin; Jonanthan Levy, both of Kfar Saba; Reuven Marko, Netanya; Aharon Ostrer, Tel Aviv; Rami Saban, Holon; Alon Shackam, Tel Aviv; Boaz Shahar, Nof Yam, all of Israel

[73] Assignee: National Semiconductor Corporation, Santa Clara, Calif.

[21] Appl. No.: 84,316

[22] Filed: Jun. 25, 1993

Related U.S. Application Data

[63] Continuation of Ser. No. 758,222, Sep. 9, 1991, abandoned, which is a continuation of Ser. No. 356,622, May 22, 1989, abandoned, which is a continuation of Ser. No. 6,016, Jan. 22, 1987, abandoned.

[51] Int. Cl.[6] .............................................. G06F 12/00
[52] U.S. Cl. ................... 395/403; 364/DIG. 1; 364/231.8; 364/256.3; 395/496; 395/375
[58] Field of Search ................................ 395/400, 425

[56] References Cited

U.S. PATENT DOCUMENTS

| 3,680,055 | 7/1972 | Wilson | 364/200 |
|---|---|---|---|
| 3,866,183 | 2/1975 | Lange | 364/200 |
| 3,905,023 | 9/1975 | Perpiglia | 364/200 |
| 4,232,366 | 11/1980 | Levy | 364/200 |
| 4,322,795 | 3/1982 | Lange et al. | 364/200 |
| 4,410,944 | 10/1983 | Kronies | 364/200 |
| 4,430,706 | 2/1984 | Sand | 364/200 |
| 4,471,482 | 9/1984 | Wilhite et al. | 364/200 |
| 4,481,573 | 11/1984 | Fukunaga et al. | 364/200 |
| 4,503,497 | 3/1985 | Krygowski et al. | 364/200 |
| 4,521,850 | 6/1985 | Wilhite et al. | 364/200 |
| 4,521,851 | 6/1985 | Trubisky et al. | 364/200 |
| 4,594,659 | 6/1986 | Guenthner et al. | 364/200 |
| 4,594,660 | 6/1986 | Guenthner et al. | 364/200 |
| 4,622,631 | 11/1986 | Frank et al. | 364/200 |
| 4,648,034 | 3/1987 | Heninger | 395/325 |
| 4,654,788 | 3/1987 | Baudleau et al. | 364/200 |
| 4,701,843 | 10/1987 | Cohen | 364/200 |
| 4,805,098 | 2/1989 | Mills, Jr. et al. | 364/900 |

FOREIGN PATENT DOCUMENTS

WO84/02799 7/1984 WIPO.

OTHER PUBLICATIONS

Stone, H. S., "Introduction to Computer" 1975, SRA, Inc., pp. 230–247 and 375–386.

Primary Examiner—Rebecca L. Rudolph
Attorney, Agent, or Firm—Limbach & Limbach; H. Donald Nelson; Richard J. Roddy

[57] ABSTRACT

A method and apparatus for prechecking (probing) the validity of an access request for writing result data to an external system prior to executing the instruction that generates the result is provided. This allows instruction execution to continue uninterrupted in the event that the write is allowed. The microprocessor's Address Unit issues a "probe" request to the Memory Management Unit (MMU) via an internal bus while saving the instruction's virtual address in a virtual address buffer local to the Address Unit. The MMU checks the validity of the "probe" request without converting the virtual address to a physical address and issues an access grant signal which is saved by the microprocessor's Execution Unit for subsequent use. The Execution Unit processes the data in parallel to the MMU checking the validity of the probe request. If the virtual address associated with the probe request resulted in an access grant signal, then the Execution Unit issues a write request while the virtual address previously stored in the Address Unit is sent to the MMU for translation to a physical address. Both the write data and the physical address are stored in a buffer in the microprocessor's Bus Interface Unit (BIU) for subsequent transfer to an external system. The data is then written to the external system at the physical address provided by the BIU.

3 Claims, 13 Drawing Sheets

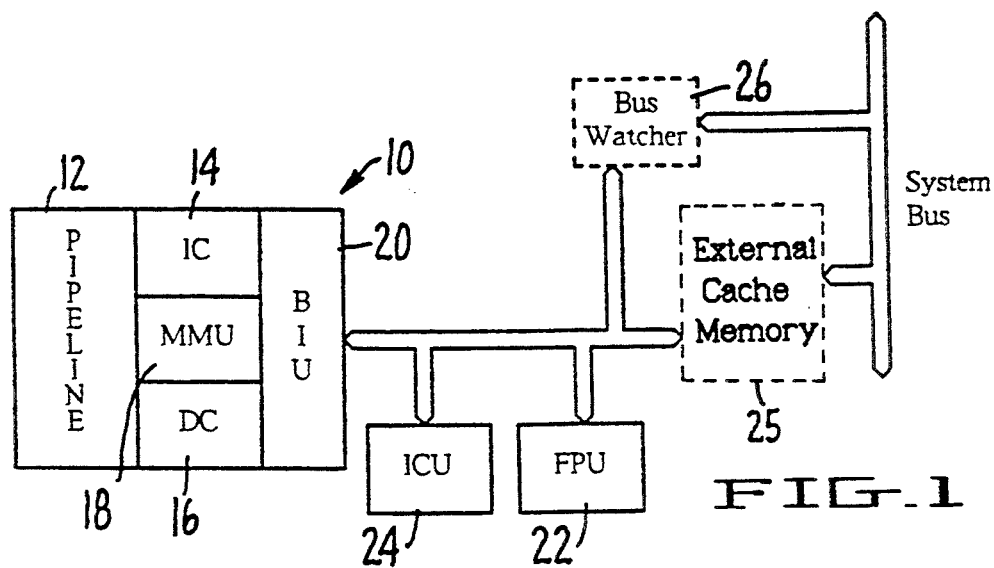
FIG_1
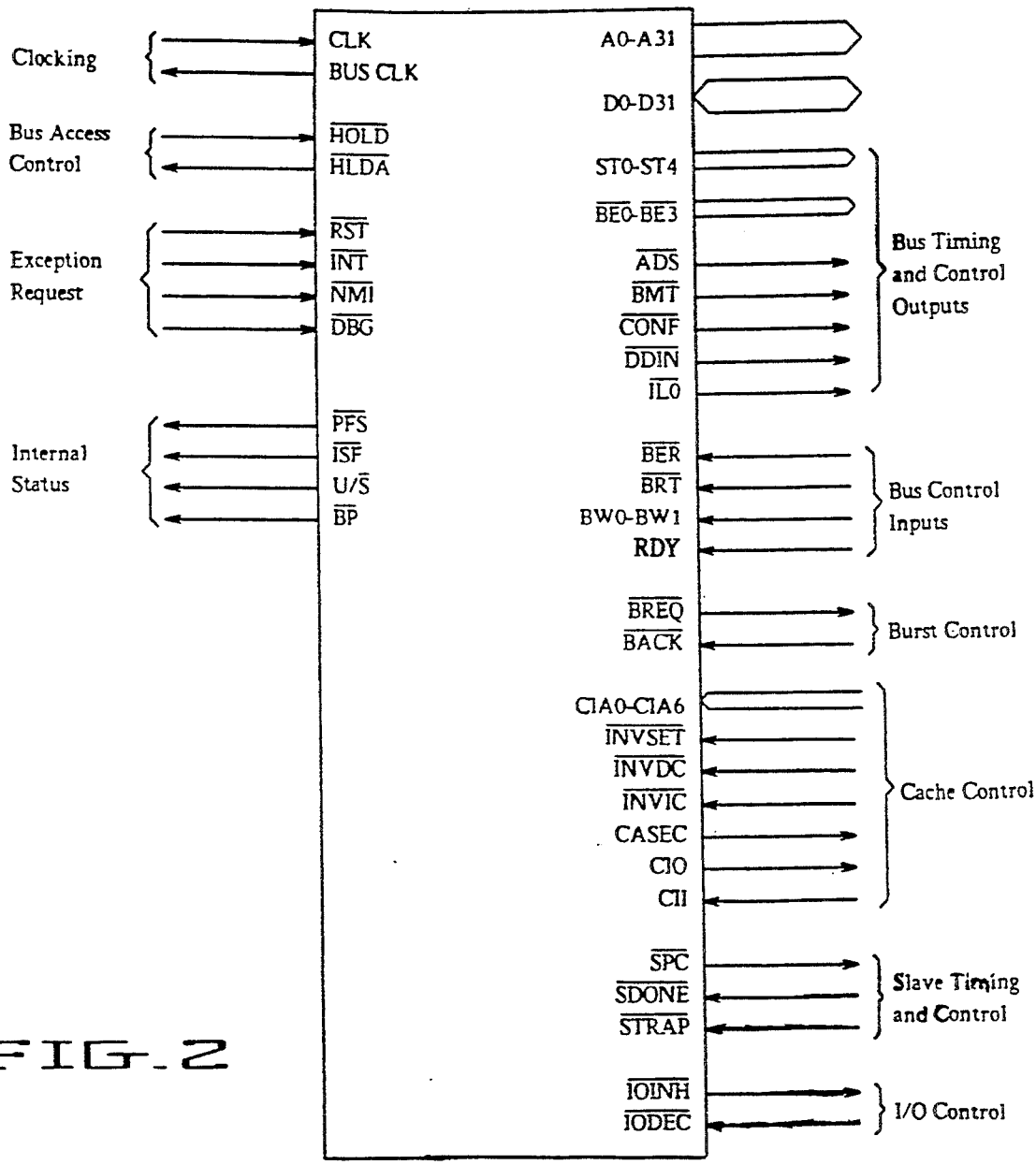
FIG_2

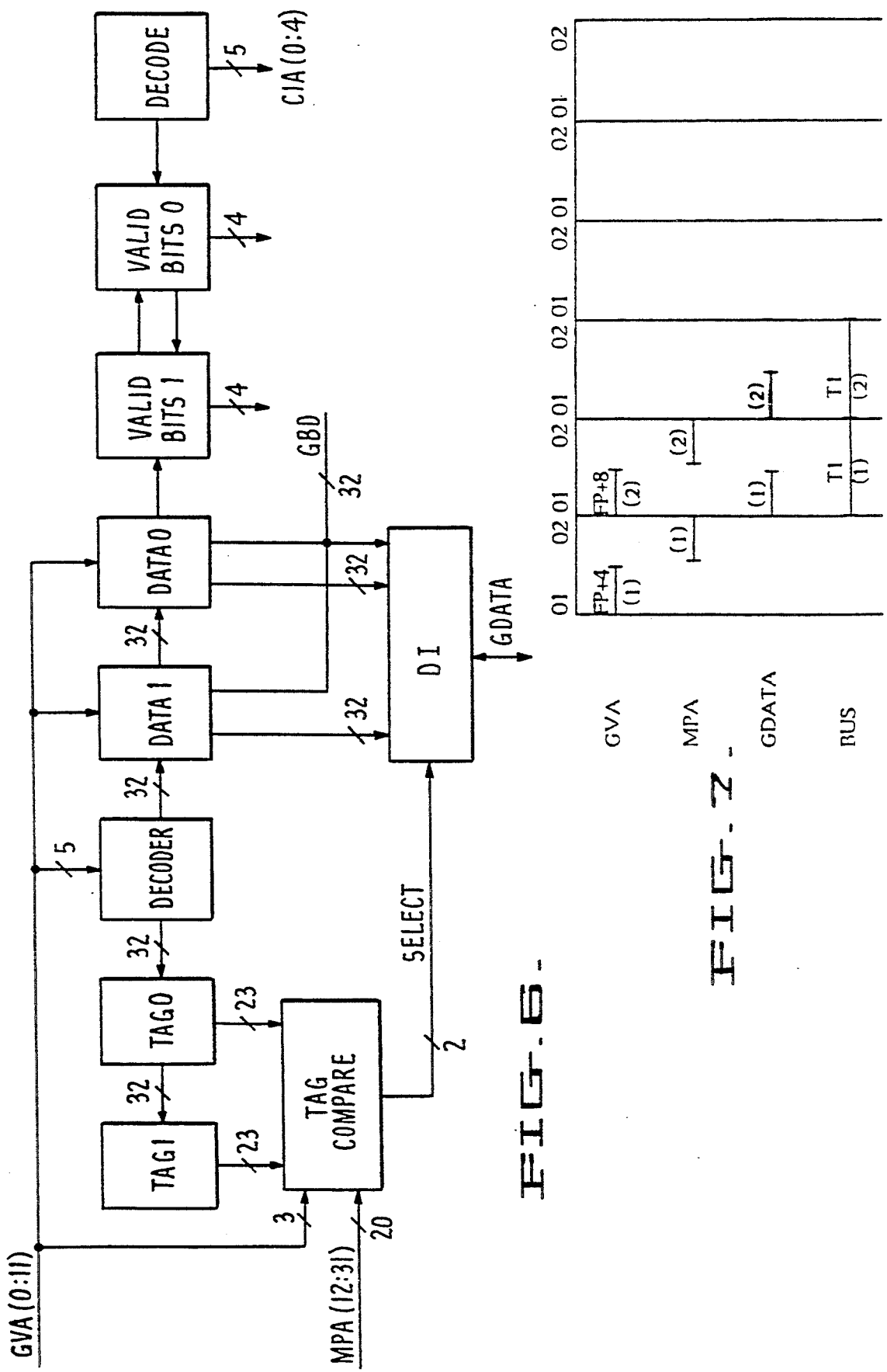

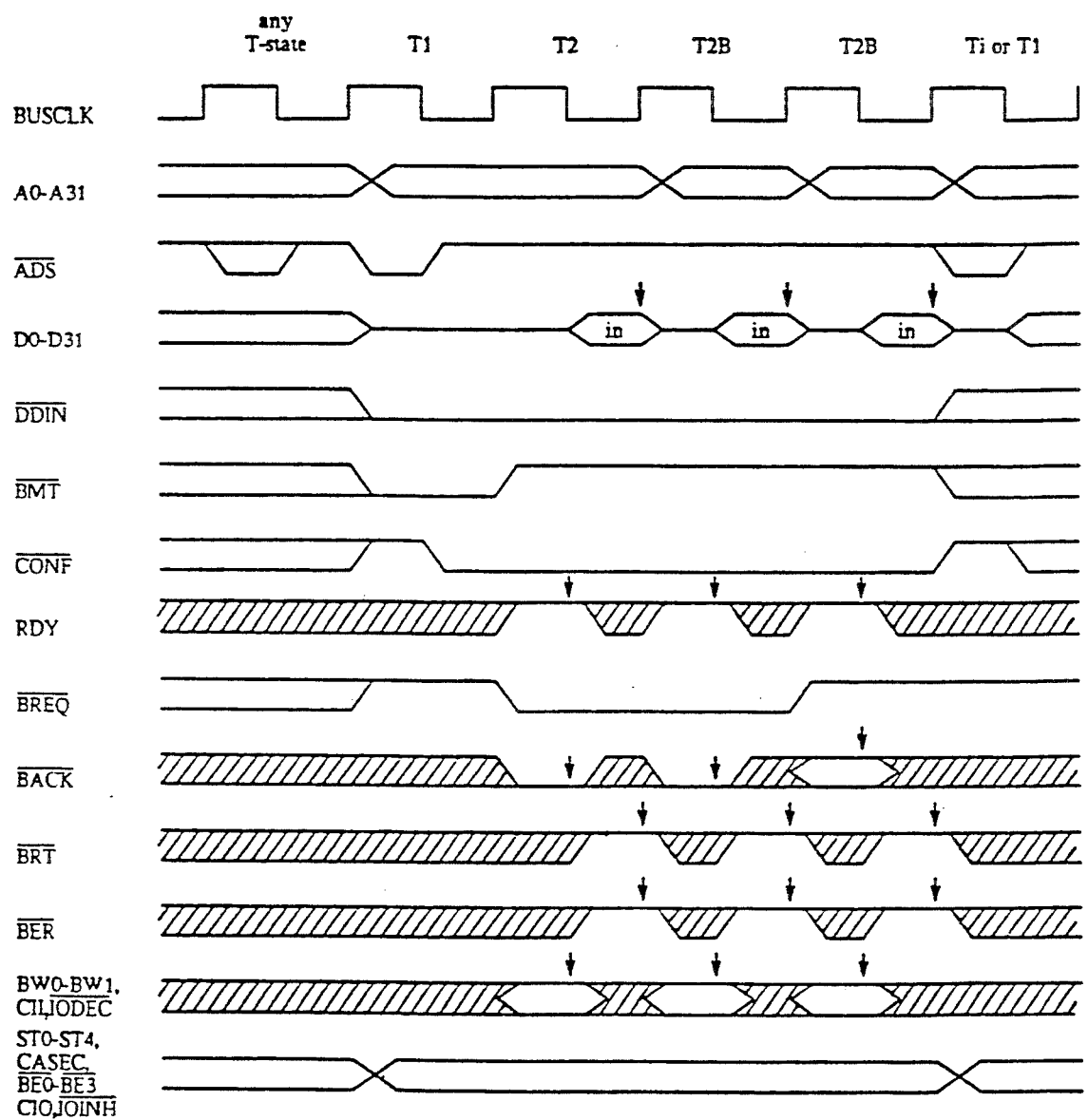
FIG_18.

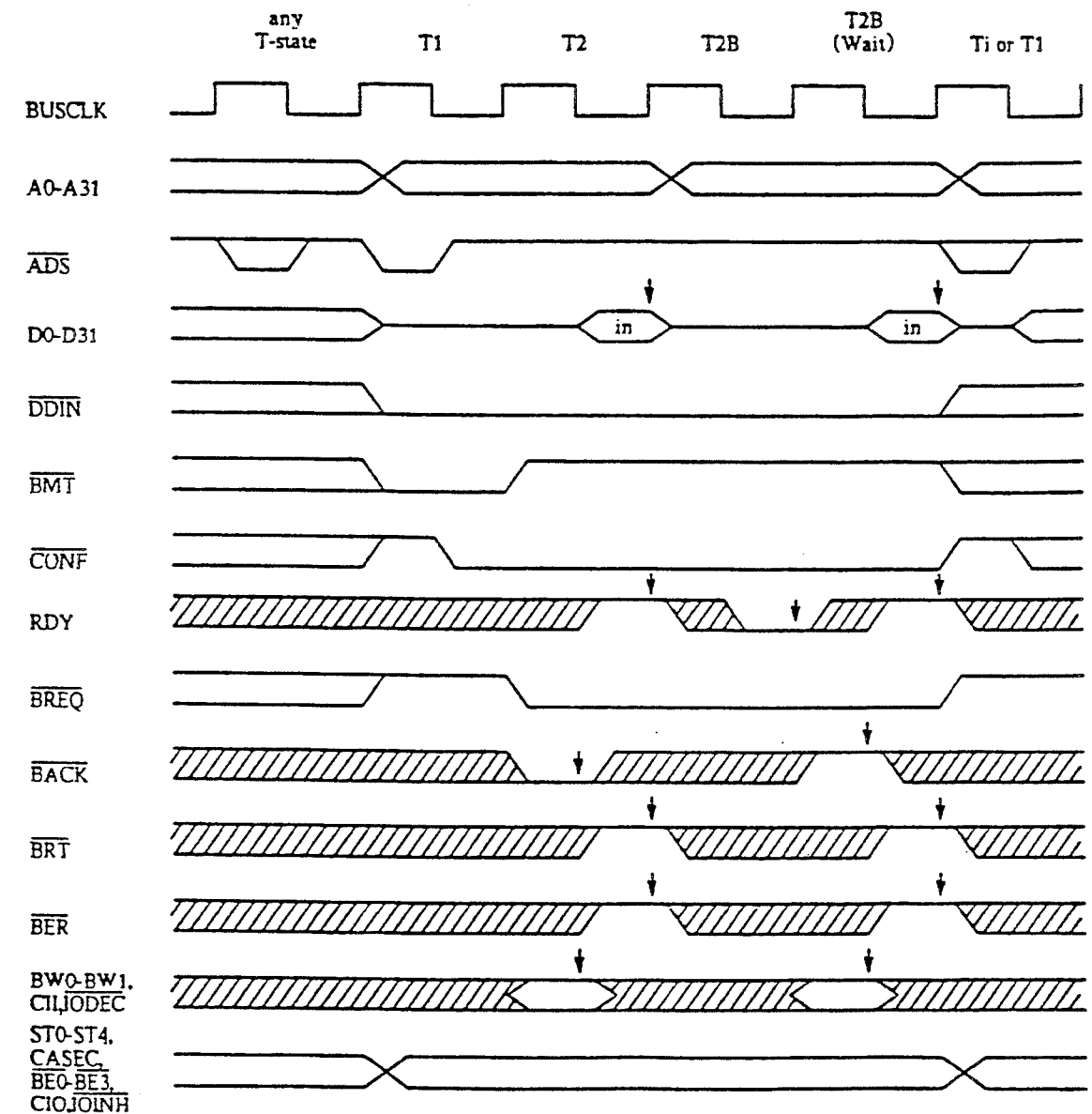
FIG_19

METHOD OF PRECHECKING THE VALIDITY OF A WRITE ACCESS REQUEST

This is a continuation of application Ser. No. 07/758,222 filed on Sep. 9, 1991 (now abandoned), being a continuation of Ser. No. 07/356,622 filed on May 22, 1989 (now abandoned), being a continuation of Ser. No. 07/006,016 filed on Jan. 22, 1987 (now abandoned).

BACKGROUND OF THE INVENTION

1. Field of the Invention.

The present invention relates to data processing systems and, in particular, to the architecture of a high performance, 32-bit microprocessor that includes an integrated instruction pipeline, memory management unit, instruction and data caches and bus interface unit.

2. Discussion of the Prior Art

All computer systems perform the same basic functions: input of information, storage of information, computational operations, control of operations and output of information.

Input devices are used to supply the information needed for computational operations and for telling the computer how to operate on the information.

Storage units contain both the information required for performing computations as well as intermediate data and computational results. The storage units also contain the instructions, i.e., the computer programs, which tell the computer what to do with the stored information.

The computational portion of a computer performs the actual arithmetic or logical tasks as directed by the program instructions.

The control unit administers the operation of the computer. It retrieves information, i.e. data and instructions, from the storage unit and decides how and when to perform operations on that information. It monitors the operation of each of the other units, recognizes when a task is completed and then tells each unit what to do next.

All computer systems, from large, high-powered mainframe supercomputers to basic personal computers, conform to the basic architecture described above. The difference between computer systems lies in the size of the particular building blocks, the "power" of the individual building blocks to perform their respective tasks, and the speed with which information can be received and transmitted by the system and, particularly, can be transferred among the building blocks within the system.

Microprocessors are computers which are implemented using semiconductor integrated circuits. Each semiconductor chip in a conventional microprocessor computing cluster constitutes one of the basic building blocks described above. Thus, a microprocessor provides the advantages common to all integrated circuit devices, namely, reduced physical size and increased speed for computing power corresponding to non-integrated systems of comparable computational and storage complexity.

It would be desirable to have available a microprocessor which integrates all of the basic building blocks on a single semiconductor chip.

However, while integrating these functions on a single microprocessor chip would significantly improve access time to memory, a major computer performance factor, certain potential problems and disadvantages must be addressed in the process. First, on-chip memory space is small compared to available system memory. Second, integrated memory organization is fixed, compared to flexible memory organization at the system level; this fixed organization can potentially restrict the application of the microprocessor. Third, an efficient microprocessor chip architecture provides for a limited number of access ports, thereby limiting external control capability and data band width. In addition, due to their small size, on-chip memories have a significant "miss" ratio; that is, often requested information is not found in the on-chip memory. It is required, therefore, that memory access be optimized both for on-chip memory "hits" and "misses". This becomes more difficult when the on-chip memory is physical (as compared to virtual) because data may be read from or written to the memory only after the virtual address is translated to a corresponding physical address by a memory management unit. This is further complicated for a microprocessor which utilizes pipelined instruction processing because memory access may be initiated simultaneously by multiple units, all of which require the services of the single memory management unit. Having a deep instruction execution pipeline also introduces a considerable (pipe break) penalty for execution of instructions that are non-sequential.

It is believed that a discussion of "virtual memory" would be helpful in understanding the present invention.

Just as work expands to fill the time available, so computer programs tend to expand over their lifetime to fill the physical memory available to them. Once the memory limits have been reached, further expansion of the program is difficult and error prone, usually requiring hard-to-manage overlays. The ideal solution to this problem is to give the program a virtually infinite (limitless) memory. A program in an infinite memory can be enlarged without bumping into any barriers. Unfortunately, memory costs usually preclude enormous physical memories With "virtual memory" the programmer is provided with the functional equivalent of a very large memory at minimal cost.

Virtual memory is a mechanism for circumventing the limits on physical memory size. Under a virtual memory system, it appears to users as if the entire logical address space were available for storage. But, in fact, at any given time only a few pages of the logical address space are mapped onto physical space. The other pages are not present in main memory at all; instead, the information in these pages is stored on a secondary storage device, such as a disk, the cost-per-bit of which is much lower.

In a virtual memory system, whenever the computer generates a memory address, the hardware checks whether that address lies in a page in memory. If it does, the address is translated to the appropriate physical address and the memory reference takes place normally. If the indicated page is not in memory, an operation called a page swap is performed and the operating system software loads the missing page from disk. If this operation is performed swiftly, the user has the illusion of a gigantic physical memory. For efficiency, when the referenced location has to be brought from the peripheral to the main memory, other locations likely to be referenced next are also brought in. Information not currently in use is removed form the main memory and returned to peripheral storage, thus making room for new pages.

The beauty of virtual memory is that the user or programmer does not have to be aware of the process. The programmer uses one consistent set of addresses called virtual addresses. The memory management hardware keeps track of where the information resides at any given time and translates the virtual address into a real location in physical memory. When the CPU finds the requested virtual address to be unavailable in main memory, it notifies the operating system, which initiates a page swap.

SUMMARY OF THE INVENTION

The present invention provides an integrated microprocessor architecture which solves the above-mentioned problems while providing a significant performance improvement over prior art microprocessors.

Accordingly, the present invention provides a method of prechecking (probing) the validity of an access request for writing result data to an external system prior to executing the instruction that generates the result. This allows instruction execution to continue uninterrupted in the event that the write is allowed.

The method comprises the following steps. The microprocessor's Address Unit issues a "probe" request to the Memory Management Unit (MMU) via an internal bus while saving the instruction's virtual address in a virtual address buffer local to the Address Unit. The MMU checks the validity of the "probe" request without converting the virtual address to a physical address and issues an access grant signal which is saved by the microprocessor's Execution Unit for subsequent use. The Execution Unit processes the data in parallel to the MMU checking the validity of the probe request. If the virtual address associated with the probe request resulted in an access grant signal, then the Execution Unit issues a write request while the virtual address previously stored in the Address Unit is sent to the MMU for translation to a physical address. Both the write data and the physical address are stored in a buffer in the microprocessor's Bus Interface Unit (BIU) for subsequent transfer to an external system. The data is then written to the external system at the physical address provided by the BIU.

Other objects, features and advantages of the microprocessor of the present invention will become apparent and be appreciated by referring to the following detailed description of the invention considered in conjunction with the accompanying drawings.

DESCRIPTION OF THE DRAWINGS

FIG. 1 is a schematic block diagram illustrating an integrated microprocessor architecture in accordance with the present invention.

FIG. 2 is a schematic diagram illustrating the interface signals of the microprocessor shown in FIG. 1.

FIG. 6 is a schematic block diagram illustrating the structure of the Data Cache of the microprocessor described herein.

FIG. 7 is a timing diagram illustrating access to the Data Cache of the microprocessor described herein.

FIG. 18 is a timing diagram illustrating a burst read cycle, having three transfers which is terminated by the microprocessor described herein.

FIG. 19 is a timing diagram illustrating a burst read cycle terminated by the system of which the microprocessor described herein is a part, the burst cycle having two transfers, the second transfer being extended by one wait state.

DETAILED DESCRIPTION OF A PREFERRED EMBODIMENT

Figure 3:
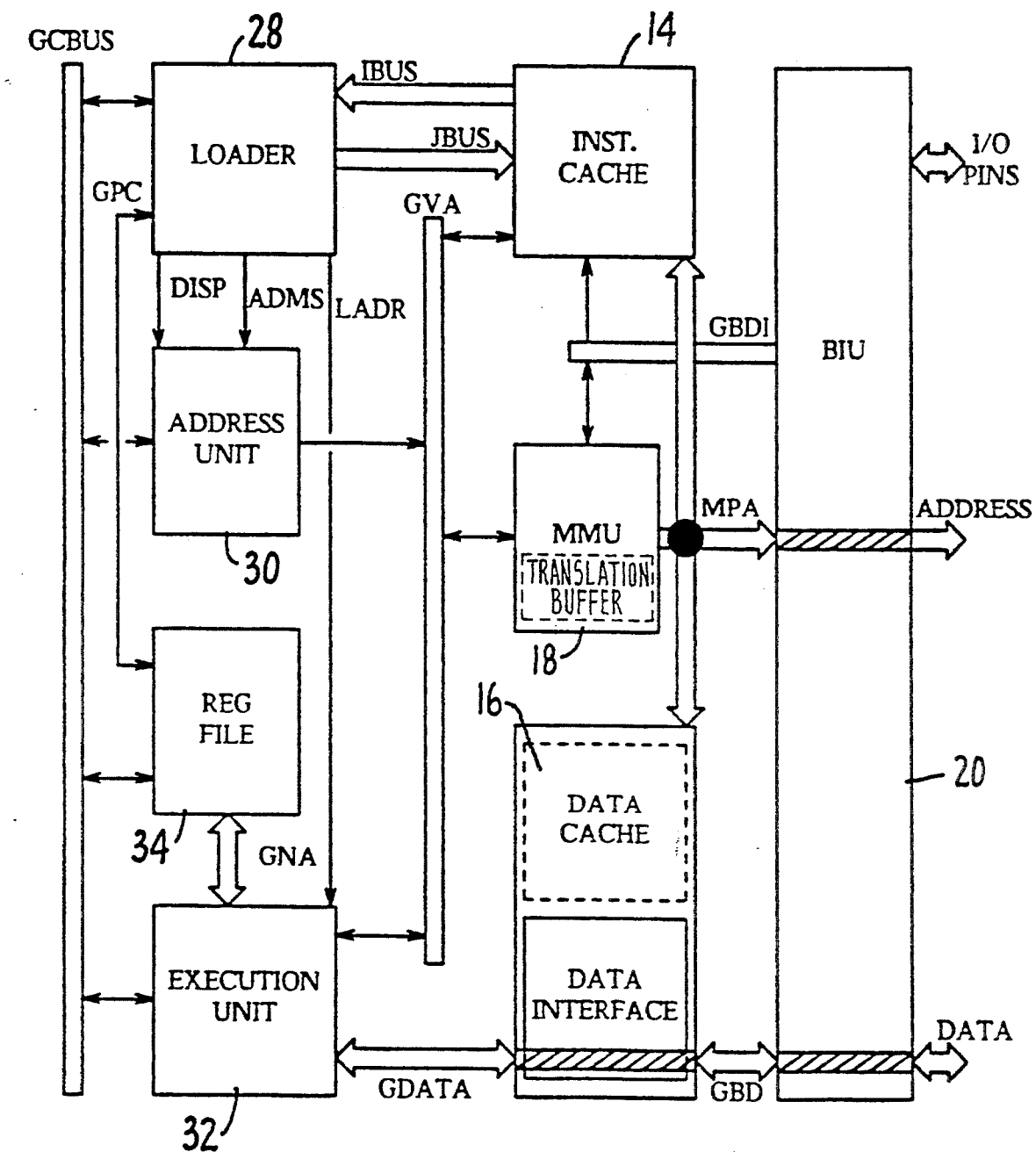
FIG. 3 is a schematic block diagram illustrating the major functional units and interconnecting buses of the microprocessor described herein.

FIG. 1 shows a microprocessor (CPU) 10 having a fully-integrated architecture in accordance with the present invention.

CPU 10 initiates bus cycles to communicate with external memory and with other devices in the computing cluster to fetch instructions, read and write data, perform floating-point operations and respond to exception requests.

CPU 10 includes an integrated 4-stage instruction Pipeline 12 that is capable of executing, at 20 MHz, up to 10 MIPS (million instructions per second). Also integrated on-chip with the instruction Pipeline 12 are three storage buffers that sustain the heavy demand of Pipeline 12 for instructions and data. The storage buffers include a 512-byte Instruction Cache 14, a 1024-byte Data Cache 16 and a 64-entry Translation Buffer which is included within an on-chip Memory Management Unit (MMU) 18. The primary functions of MMU 18 are to arbitrate requests for external references and to translate virtual addresses to physical addresses. An integrated Bus Interface Unit (BIU) 20 controls the bus cycles for external references.

Placing the cache and memory management functions on the same chip with the instruction Pipeline 12 provides excellent cost/performance by improving memory access time and bandwidth for all microprocessor applications.

CPU 10 is also compatible with available peripheral devices, such as Interrupt Control Unit (ICU) 24 (e.g., NS32202). The ICU interface to CPU 10 is completely asynchronous, so it is possible to operate ICU 24 at lower frequencies than CPU 10.

CPU 10 incorporates its own clock generator. Therefore, no timing control unit is required.

The architecture of CPU 10 also supports external cache memory 25 and provides "Bus Watcher" circuitry 26 for maintaining coherence of the internal caches and external memory. Both of these features will be discussed in greater detail below.

As shown in FIG. 2, CPU 10 has 114 interface signals for bus timing and control, cache control, exception requests and other functions. The following list provides a summary of the CPU 10 interface signal functions:

Input signals $\overline{\text{BACK}}$ Burst Acknowledge (Active Low). When active in response to a burst request, indicates that the memory supports burst cycles.

$\overline{\text{BER}}$ Bus Error (Active Low). Indicates to CPU 10 that an error was detected during the current bus cycle.

$\overline{\text{BRT}}$ Bus Retry (Active Low). Indicates that CPU 10 must perform the current bus cycle again.

BW0–BW1 Bus Width (2 encoded lines). These lines define the bus width (8, 16 or 32 bits) for each data transfer, as shown in Table 1.

TABLE 1

| BW1 | BW0 | Bus Width |
|-----|-----|-----------|
| 0 | 0 | reserved |
| 0 | 1 | 8 bits |
| 1 | 0 | 16 bits |
| 1 | 1 | 32 bits |

CIA0–CIA6 Cache Invalidation Address (7 encoded lines) The cache invalidation address is presented on the CIA bus. Table 2 presents the CIA lines relevant for each of the internal caches of CPU 10.

TABLE 2

| CIA (0:4) | Set address in DC and IC |
|-----------|--------------------------|
| CIA (5:6) | Reserved |

CII Cache Inhibit In (Active High). Indicates to CPU 10 that the memory reference of the current bus cycle is not cacheable.

$\overline{\text{CINVE}}$ Cache Invalidation Enable. Input which determines whether the External Cache Invalidation options or the Test Mode operation have been selected.

CLK Clock. Input clock used to derive all timing for CPU 10.

$\overline{\text{DBG}}$ Debug Trap Request (Falling-Edge Activated). High-to-low transition of this signal causes Trap (DBG).

$\overline{\text{HOLD}}$ Hold Request (Active Low). Requests CPU 10 to release the bus for DMA or multiprocessor purposes.

$\overline{\text{INT}}$ Interrupt (Active Low). Maskable interrupt request.

$\overline{\text{INVSET}}$ Invalidate Set (Active Low). When Low, only a set in the on-chip caches is invalidated; when High, the entire cache is invalidated.

$\overline{\text{INVDC}}$ Invalidate Data Cache (Active Low). When low, an invalidation is done in the Data Cache.

$\overline{\text{INVIC}}$ Invalidate Instruction Cache (Active Low). When low, an invalidation is done in the Instruction Cache.

$\overline{\text{IODEC}}$ I/O Decode (Active Low). Indicates to CPU 10 that a peripheral device is addressed by the current bus cycle.

$\overline{\text{NMI}}$ Nonmaskable Interrupt (Falling-Edge Activated). A High-to-Low transition of this signal requests a nonmaskable interrupt.

RDY Ready (Active High). While this signal is not active, CPU 10 extends the current bus cycle to support a slow memory or peripheral device.

$\overline{\text{RST}}$ Reset (Active Low). Generates reset exceptions to initialize CPU 10.

$\overline{\text{SDONE}}$ Slave Done (Active Low). Indicates to CPU 10 that a Slave Processor has completed executing an instruction.

$\overline{\text{STRAP}}$ Slave Trap (Active Low). Indicates to CPU 10 that a Slave Processor has detected a trap condition while executing an instruction.

Output Signals

A0–A31 Address Bus (3-state, 32 lines) Transfers the 32-bit address during a bus cycle. A0 transfers the least significant bit.

$\overline{\text{ADS}}$ Address Strobe (Active Low, 3-State). Indicates that a bus cycle has begun and a valid address is on the address bus.

$\overline{\text{BE0}}$–$\overline{\text{BE3}}$ Byte Enables (Active Low, 3-state, 4 lines). Signals enabling transfer on each byte of the data bus, as shown in Table 3.

TABLE 3

| BE | Enables Bits |
|----|--------------|
| 0 | 0–7 |
| 1 | 8–15 |
| 2 | 16–23 |
| 3 | 24–31 |

$\overline{\text{BMT}}$ Begin Memory Transaction (Active Low, 3-State). Indicates that the current bus cycle is that is, the bus cycle has not been cancelled. Available earlier in the bus cycle than $\overline{\text{CONF}}$.

$\overline{\text{BP}}$ Break Point (Active Low). Indicates that CPU 10 has detected a debug condition.

$\overline{\text{BREQ}}$ Burst Request (Active Low, 3-state). Indicates that CPU 10 is requesting to perform burst cycles.

BUSCLK Bus Clock Output clock for bus timing.

CASEC Cache Section (3-state) For cacheable data read bus cycles, indicates the section of the on-chip Data Cache 18 into which the data will be placed.

CIO Cache Inhibit (Active High). Indication by CPU 10 that the memory reference of the current bus cycle is not cacheable. Controlled by the CI-bit in the level-2 Page Table Entry.

$\overline{\text{CONF}}$ Confirm Bus Cycle (Active Low, 3-state). Indicates that a bus cycle initiated with ADS is valid; that is, the bus cycle has not been cancelled.

DDIN Data Direction In (Active Low, 3-state). Indicates the direction of transfers on the data bus. When Low during a bus cycle, indicates that CPU 10 is reading data; when High during a bus cycle, indicates that CPU 10 is writing data.

HLDA Hold Acknowledge (Active Low). Activated by CPU 10 in response to the 1-HOLD input to indicate that CPU 10 has released the bus.

ILO Interlocked Bus Cycle (Active Low). Indicates that a sequence of bus cycles with interlock protection is in progress.

IOINH I/O Inhibit (Active Low). Indicates that the current bus cycle should be ignored if a peripheral device is addressed.

ISF Internal Sequential Fetch. Indicates, along with PFS, that the instruction beginning execution is sequential (ISF=Low) or non-sequential (ISF =High).

PFS Program Flow Status (Active Low). A pulse on this signal indicates the beginning of execution for each instruction.

SPC Slave Processor Control (Active Low). Data Strobe for Slave Processor bus cycles.

ST0-ST4 Status (5 encoded lines). Bus cycle status code; ST0 is the least significant bit. The encoding is shown in Table 4.

U/S User/Supervisor (3 state). Indicates User-(U/S=High) or Supervisor (U/S=Low) Mode.

Bidirectional Signals

D0-D31 Data Bus (3-state,32 lines). Transfers 8, 16, or 32 bits of data during a bus cycle. D0 transfers the least significant bit.

TABLE 4

| \multicolumn{5}{c|}{STATUS} | |
|---|---|---|---|---|---|
| 4 | 3 | 2 | 1 | 0 | DESCRIPTION |
| 0 | 0 | 0 | 0 | 0 | Idle |
| 0 | 0 | 0 | 0 | 1 | Idle: Wait Instruction |
| 0 | 0 | 0 | 1 | 0 | Idle: Halted |
| 0 | 0 | 0 | 1 | 1 | Idle: Waiting for Slave |
| 0 | 0 | 1 | 0 | 0 | Interrupt acknowledge, Master |
| 0 | 0 | 1 | 0 | 1 | Interrupt acknowledge, Cascaded |
| 0 | 0 | 1 | 1 | 0 | End of Interrupt, Master |
| 0 | 0 | 1 | 1 | 1 | End of Interrupt, Cascaded |
| 0 | 1 | 0 | 0 | 0 | Sequential Instruction Fetch |
| 0 | 1 | 0 | 0 | 1 | Non-sequential Instruction Fetch |
| 0 | 1 | 0 | 1 | 0 | Data transfer |
| 0 | 1 | 0 | 1 | 1 | Read Read-Modify-Write Operand |
| 0 | 1 | 1 | 0 | 0 | Read for Effective address |
| 0 | 1 | 1 | 0 | 1 | Access PTE1 by MMU |
| 0 | 1 | 1 | 1 | 0 | Access PTE2 by MMU |
| 0 | 1 | 1 | 1 | 1 | reserved |
| 1 | 0 | 0 | 0 | 0 | reserved |
| 1 | 0 | 0 | 0 | 1 | reserved |
| 1 | 0 | 0 | 1 | 0 | reserved |
| 1 | 0 | 0 | 1 | 1 | reserved |
| 1 | 0 | 1 | 0 | 0 | reserved |
| 1 | 0 | 1 | 0 | 1 | reserved |
| 1 | 0 | 1 | 1 | 0 | reserved |
| 1 | 0 | 1 | 1 | 1 | reserved |
| 1 | 1 | 0 | 0 | 0 | reserved |
| 1 | 1 | 0 | 0 | 1 | reserved |
| 1 | 1 | 0 | 1 | 0 | reserved |
| 1 | 1 | 0 | 1 | 1 | reserved |
| 1 | 1 | 1 | 0 | 0 | reserved |
| 1 | 1 | 1 | 0 | 1 | Transfer Slave Processor Operand |
| 1 | 1 | 1 | 1 | 0 | Read Slave Processor Status |
| 1 | 1 | 1 | 1 | 1 | Broadcast Slave ID + Opcode |

Referring to FIG. 3, CPU 10 is organized internally as eight major functional units that can operate in parallel to perform the following operations to execute instructions: prefetch, decode, calculate effective addresses and read source operands, calculate results and store to registers, and store results to memory.

A Loader 28 prefetches instructions and decodes them for use by an Address Unit 30 and an Execution Unit 32. Loader 28 receives code characters from Instruction Cache 14 on the IBUS bus in the form of double words and aligns the code characters as the corresponding instructions. Loader 28 transfers instructions received from Instruction Cache 14 into an 8-byte instruction queue. Loader 28 can extract an instruction field on each cycle, where a "field" means either an opcode (1 to 3 bytes including addressing mode specifiers), displacement or immediate value. Loader 28 decodes the opcode to generate the initial microcode address, which is passed on the LADR bus to Execution Unit 32. The decoded general addressing modes are passed on the ADMS bus to Address Unit 30. Displacement values are passed to Address Unit 30 on the DISP bus. Immediate values are available on the GCBUS. Loader 28 also includes a branch-prediction mechanism, which is described in greater detail below.

Address Unit 30 calculates effective addresses using a dedicated 32-bit adder and reads source operands for Execution Unit 32. Address Unit 30 controls a port from a Register File 34 to the GCBUS through which it transfers base and index values to the address adder and data values to Execution Unit 32. Effective addresses for operand references are transferred to MMU 18 and Data Cache 16 on the GVA bus, which is the virtual address bus.

Execution Unit 32 includes the data path and the microcoded control for executing instructions and processing exceptions. The data path includes a 32-bit Arithmetic Logic Unit (ALU), a 32-bit barrel shifter, an 8-bit priority encoder, and a number of counters. Special-purpose hardware incorporated in Execution Unit 32 supports multiplication, retiring one bit per cycle with optimization for multipliers of small absolute value.

Execution Unit 32 controls a port to Register File 34 from the GNA bus on which it stores results. The GNA bus is also used by Execution Unit 32 to read values of dedicated registers, like the configuration and interrupt base registers. A 2-entry data buffer allows Execution Unit 32 to overlap the execution of one instruction with storing results to memory for previous instructions. The GVA bus is used by Execution Unit 32 to perform memory references for complex instructions (e.g., string operations) and exception processing.

The Program Counter PC, Static Base Register SB, User Stack Pointer SP1, Interrupt Stack Pointer SP0, Frame Pointer FP and Interrupt Base Register INTBASE dedicated registers are configured in 32 bits. The User Stack Pointer SP1 can be directly loaded and stored using privileged Load Processor Register LPRi and Store Processor Register SPRi instructions regardless of the value of the S-bit in the Program Status Register PSR, thereby allowing CPU 10 to switch tasks more quickly.

Table 5 below shows the format of the Program Status Register. In the PSR, bit 4 implements an Integer Overflow flag (V-flag). The V-flag enables generation of trap (OVF) when an integer arithmetic operation overflows.

TABLE 5

| Supervisor Flags | | User Flags | |
|---|---|---|---|
| x x x x | I P S U | N Z F V x L T C | |
| 15 | 8 | 7 | 0 |

The Configuration Register CFG is also configured in 32 bits, of which 9 bits are implemented. The implemented bits enable various operating modes for CPU 10, including vectoring of interrupts, execution of slave instructions, and control of the on-chip Instruction Cache 14 and Data Cache 16. When the contents of the Configuration Register register are loaded, the values loaded to bits 4 through 7 are ignored; when the contents of the Configuration Register are stored, these bits are 1.

The format of the Configuration Register is shown in Table 6. The various control bits are described below.

TABLE 6

| x x x LIC IC LDC DC CE 1 1 1 1 C M F I |
|---|
| 15                                    0 |

I Interrupt vectoring. This bit controls whether maskable interrupts are handled in nonvectored (VI=0) or vectored (VI=1) mode.

F Floating-point instruction set. This bit indicates whether a floating-point unit is present to execute floating-point instructions. If this bit is 0 when CPU 10 executes a floating-point instruction, then CPU 10 transfers the instruction and any necessary operands to the floating point unit using the slave-processor protocol.

M Memory management instruction set. This bit enables the execution of memory management instructions. If this bit is 0 when CPU 10 executes Load MMU Register LMR, Store MMU Register SMR, Validate Address for Reading RDVAL, or Validate Address for Writing WRVAL instruction, then trap (UND) occurs. Otherwise, if this bit is 1, CPU 10 executes LMR, SMR, RDVAL, the WRVAL instructions using the on-chip MMU 10.

C Custom instruction set. This bit indicates whether a custom slave processor is present to execute custom instructions. If this bit is 0 when CPU 10 executes a custom instruction, then trap (UND) occurs. Otherwise, if this bit is 1 when CPU 10 executes a custom instruction, then CPU 10 transfers the instruction and any necessary operands to the custom slave processor using the slave-processor protocol.

DE Direct-Exception enable. This bit enables a Direct-Exception mode, a mode of processing exceptions that improves response time of CPU 10 to interrupts and other exceptions.

DC Data Cache Enable. This bit enables Data Cache 16 to be accessed for data reads and writes.

LDC Lock Data Cache. This bit controls whether the contents of Data Cache 16 are located to fixed memory locations (LDC=1) or updated when a data read is missing from the cache (LIC=0).

IC Instruction Cache Enable. This bit enables Instruction Cache 14 to be accessed for instruction fetches.

LIC Lock Instruction Cache. This bit controls whether the contents of Instruction Cache 14 are located to fixed memory locations (LIC=1) or updated when an instruction fetch is missing from the cache (LIC=0).

Additional information regarding the register set, memory organization, functions of dedicated memory areas and the instruction set used by CPU 10 may be found in the following document: "Series 3200 Instruction Set Reference Manual", Publication Number 420010099-001B, June 1984, which is hereby incorporated by reference.

Instruction Cache 14, Address Unit 30 and Execution Unit 32 make requests to MMU 18 for memory references. MMU 18 arbitrates the requests, granting access to transfer a virtual address on the GVA bus. MMU 18 translates the virtual address it receives on the GVA bus to the corresponding physical address, using its 64-entry Translation Buffer. MMU 18 transfers the physical address on the MPA bus to either Instruction Cache 14 or Data Cache 16, depending on whether an instruction or data reference is being performed. The physical address is also transferred to BIU 20 for an external bus cycle.

MMU 18 contains the following seven registers which are dedicated for memory management functions:

Feature Enable Word (FEW)
Abort Status Register (ASR)
Translation Exception Address Register (TEAR)
Page Table Base Register 0 (PTB0)
Page Table Base Register 1 (PTB1)
Invalidate Virtual Address 0 (IVAR0)
Invalidate Virtual Address 1 (IVAR1)

These registers are accessed using the LMR load and SMR store instructions. In CPU 10, the contents of the TEAR register can be both loaded and stored.

CPU 10 contains the following four registers which are dedicated for debugging functions:

Debug Condition Register (DCR)
Debug Status Register (DSR)
Compare Address Register (CAR)
Breakpoint Program Counter (BFC)

These registers are accessed using privileged forms of the LPRi load and SPRi store instructions.

CPU 10 implements full 32-bit virtual addresses. This allows access to 4 gigabytes (4,294,967,296 bytes) of virtual memory, although the top 16 megabytes are dedicated, as shown in Table 7 and explained in greater detail below.

TABLE 7

| Address (Hex) | |
|---|---|
| FFFFFFFF | Interrupt Control |
| FFFFFE00 | Reserved |
| FF800000 | Memory-Mapped I/O |
| 00000000 | Memory and I/O |

CPU 10 supports the use of memory-mapped peripheral devices and co-processors. As explained in greater detail below, memory-mapped devices can be located at arbitrary locations in the address space except for the upper 8 megabytes of virtual memory (addresses between FF800000 (hex) and FFFFFFFF (hex), inclusive), which are reserved. Nevertheless, high-performance peripheral devices and coprocessors should be located in a specific 8 MB region of virtual memory (addresses between FF000000 (hex) and FF7FFFFF (hex), inclusive), that is dedicated for memory-mapped I/O. This is because CPU 10 detects references to the dedicated locations and automatically applies special handling (described below) required by instruction Pipeline 12 for I/O references. When making I/O references to addresses outside the dedicated region, external hardware indicates to CPU 10 that the special handling is required; however, performance is less than for references to the dedicated locations.

CPU 10 supports a privileged Cache Invalidation (CINV) instruction and privileged access to the following dedicated registers using the LPRi and SPRi instructions: Configuration CFG, User Stack Pointer SP1, Debug Condition DCR, Debug Status DSR, Compare Address CAR, and Break Point Counter BPC.

MMU 18 provides support for demand-paged virtual memory, translating 32-bit virtual addresses into 32-bit physical addresses. The page size is 4K bytes. As stated above, high-speed address translation is performed on-chip through a Translation Buffer contained within MMU 18 that holds the address mappings for 64 pages. If the information necessary to translate a virtual address is missing from the Translation Buffer, CPU 10 automatically locates the information from 2 levels of page tables in main memory and updates the Translation Buffer. If MMU 18 detects a protection violation or page fault while translating an address for a reference required to execute an instruction, trap (ABT) occurs.

Translation requests to MMU 18 can be made either by Instruction Cache 14, Address Unit 30 or Execution Unit 32. Execution Unit 32 can make two simultaneous requests, one for reads and one for writes.

If more than one request is received by MMU 18 at one time, then it grants access permission to the GVA bus according to the following priority list:
1. Execution Unit writes when its internal write buffer is full;
2. Execution Unit reads;
3. Address Unit accesses;
4. Instruction Cache reads, which are made by the Instruction Cache if a new page is referenced as described below; and
5. Execution Unit writes when its internal write buffer is not full.

The seven above-mentioned memory management registers (FEW, ASR, TEAR, PTB0, PTB1, IVAR0 and IVAR1) can all be loaded using the LMR load instruction. All of the registers except IVAR0 and IVAR1 can be stored. IVAR0 and IVAR1 are pseudo-registers; they are loaded with values only to control Translation Buffer invalidation.

The Feature Enable Word (FEW) Register is a 32-bit register that controls the operation of MMU 18. Only 4 bits are implemented; bits 4 through 7 are not implemented. Bits 4 through 7 are ignored when the contents of the FEW are loaded; these bits are 0 when the contents of the FEW are stored.

The various FEW control bits are described below.

TU Translate User. When this bit is 1, address translation is enabled for User-Mode memory references. When this bit is 0, address translation is disabled for User-Mode memory references.

TS Translate Supervisor. When this bit is 1, address translation is enabled for Supervisor-Mode memory references. When this bit is 0, address translation is disabled for Supervisor-Mode memory references.

DS Dual Space. When this bit is 1, then FTB1 contains the level-1 page table base address of all addresses specified in User-Mode, and PTB0 contains the level-1 page table base address of all addresses specified in Supervisor-Mode. When this bit is 0, then PTB0 contains the level-1 page table base address of all addresses specified in both User and Supervisor Modes.

AO Access Override. When this bit is 1, MMU 18 overrides the protection level for all memory references. This permits a User-Mode program to access memory locations that would otherwise be accessible only in Supervisor Mode. When this bit is 0, MMU 18 does not override the protection level.

The Abort Status Register ASR is a 32-bit register that holds information concerning the occurrence of a trap (ABT). Only 8 bits are implemented in the ASR. Bits 8 through 18 are ignored when the contents of the ASR are loaded; these bits are 0 when the contents of the ASR are stored.

The contents of the ASR are only updated by MMU 18 when a protection violation or page fault is detected while translating an address for a reference required to execute an instruction. Thus, for example, the ASR is not updated if a page fault is detected while prefetching an instruction that is not executed because the previous instruction caused a trap.

The various control bits of the ASR are described below.

TX0–TX1 Translation Exception. These bits specify the cause of the trap (ABT) according to the following encoding.

| TX1 | TX0 | |
| --- | --- | --- |
| 0 | 0 | No Translation Exception |
| 0 | 1 | First Level PTE invalid |
| 1 | 0 | Second Level PTE invalid |
| 1 | 1 | Protection Violation |

If an invalid Page Table Entry (PTE) and a protection violation are detected simultaneously, the TX-field indicates the protection violation.

NDDI This bit indicates whether the trap (ABT) was caused by a read or write reference. If NDDI is 0, the trap (ABT) was caused by a read operation, including the case where a write-protection violation was detected during the read for an operand with access class of read-modify-write. If NDDI is 1, the trap (ABT) was caused by a write operation.

UNS User/Supervisor. This bit indicates whether the trap (ABT) was caused by a User-Mode or Supervisor-Mode reference. If UNS is 1, then the trap (ABT) was caused by a User-Mode reference; otherwise, the trap (ABT) was caused by a Supervisor-Mode reference.

ST0–ST3 These bits indicate the kind of reference that caused the trap (ABT), according to the following encoding.

| | |
| --- | --- |
| 1000 | Sequential Instruction Fetch |
| 1001 | Non-Sequential Instruction Fetch |
| 1010 | Data Transfer |
| 1011 | Read Read-Modify-Write Operand |
| 1100 | Read for Effective Address |

If a reference for an End-of-Interrupt bus cycle (either Master or Cascaded) causes a trap (ABT), then the value of the ST-field is undefined.

The Translation Exception Address Register TEAR is a 32-bit register that holds the virtual address for the reference that caused a trap (ABT). The contents of the TEAR is only updated by MMU 18 when a protection violation or page fault is detected while translating an address for a reference required to execute an instruction. Thus, for example, the TEAR register is not updated if the page fault is detected while prefetching an instruction that is not executed because the previous instruction caused a trap.

The Page Table Base Registers PTB0 and PTB1 are 32-bits, of which 20 bits are implemented. These registers specify the base addresses of the level-1 page tables used in address translation. When either PTB0 and PTB1 is loaded by executing an LMR instruction, MMU 18 automatically invalidates all entries in the Translation Buffer that had been translated using the old value in the selected PTB register.

The Invalidate Virtual Address Registers (IVAR0 and IVAR1) are 32-bit pseudo-registers. When an LMR instruction is executed to load a virtual address to one of these registers, MMU 18 searches the Translation Buffer to locate an entry that would be used to translate the address. MMU 18 invalidates such an entry, if one is found. Loading IVAR0 specifies that the address to invalidate is translated according to the level-1 page table that is pointed to by PTB0; loading IVAR1 specifies that the address to invalidate is translated according to the level-1 page table that is pointed to by PTB0.

As stated above, the Translation Buffer provides direct virtual to physical address mapping for recently used memory pages. Entries in the Translation Buffer are allocated and replaced automatically by MMU 18.

The Translation Buffer is a content-addressable memory that associates a virtual address with the information necessary for translation and access protection. Each of the 64 entries in the Translation Buffer stores the virtual and physical Page Frame Numbers PFN, i.e. the 20 most-significant bits of the address, along with the address space for the virtual page, the protection-level for the page, and the Modified and Cache-Inhibit bits from the level-2 Page Table Entry PTE.

To translate a virtual address to the corresponding physical address, the virtual PFN and the Address Space AS are compared with the entries in the Translation Buffer. If a valid entry with a matching PFN and AS is already present in the Translation Buffer, then the physical addresses is available immediately. Otherwise, if no valid entry in the Translation Buffer has the matching PFN and AS, MMU 18 translates the virtual address using a translation algorithm (described below) and places the missing information into the Translation Buffer. MMU 18 also performs the translation algorithm upon writing to a page that has not been previously modified. MMU 18 uses a First-In-First-Out algorithm for replacing entries.

When translation is enabled for a memory reference, MMU 18 translates 32-bit virtual addresses to 32-bit physical addresses, checking for protection violations on each reference, and possibly inhibiting the use of the on-chip caches for the reference. When translation is disabled for a reference, the physical address is identical to the virtual addresses, no protection checking is performed, and the on-chip caches are not inhibited for the reference.

Figure 4:
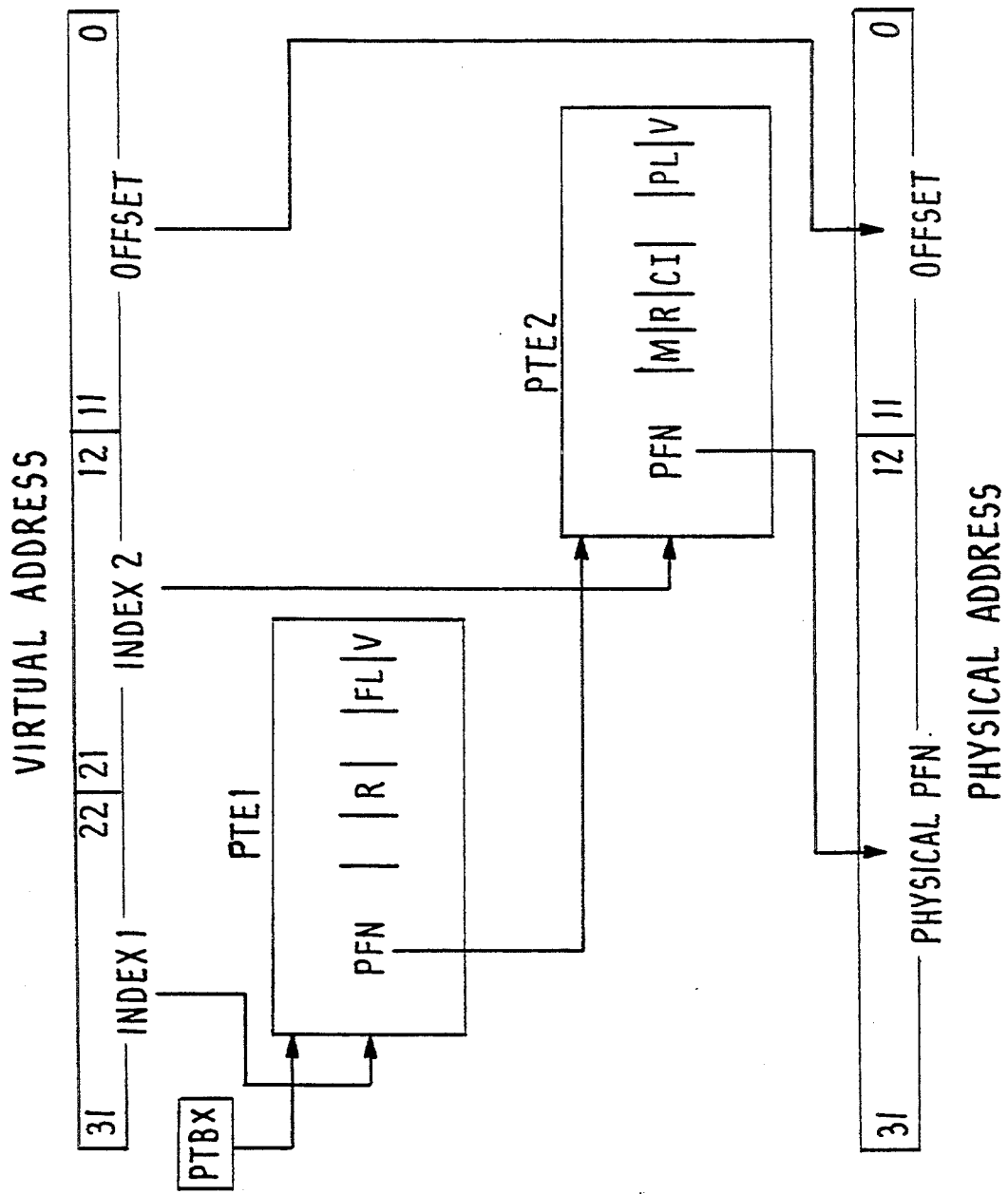
FIG. 4 is a flow sheet illustrating the translation algorithm utilized by the microprocessor of the present invention.

MMU 18 translates addresses using 4KB pages and two levels of translation tables. The virtual address is divided into three components: INDEX1, INDEX2 and OFFSET. INDEX1 and INDEX2 are both 10-bit fields used to point into the first- and second-level page tables, respectively. OFFSET is the lower 12 bits of the virtual address; it points to a byte within the selected page. A diagram of the translation algorithm is shown in FIG. 4.

When reaching PTEs during address translation, MMU 18 bypasses Data Cache 16, referring always to external memory. When updating a PTE that is located in Data Cache 16, MMU 18 updates the contents of the PTE in both Data Cache 16 and external memory.

The following discussion describes the formats of the first- and second-level PTEs and the details of the translation algorithm.

Table 10 shows the format of a Page Table Entry. The various fields are described below.

The V-bit is the Valid bit indicator. If V is 1, it indicates that the PFN, PL, R, M and CI fields of the PTE are all valid. If V is 0, it indicates that only the PL field is valid.

The PL field determines the protection level assigned to a certain page or group of pages. Table 9 shows the encoding of the PL field.

TABLE 9

| ADDRESS SPACE | AS | PROTECTION-LEVEL FIELD | | | |
|---|---|---|---|---|---|
| | | 00 | 01 | 10 | 11 |
| User | 1 | no access | no access | read only | full access |
| Supervisor | 0 | read only | full access | full access | full access |

The CI-bit is the Cache Inhibit indicator; it appears only in second-level PTEs. If CI is 1, then instruction-fetch and data-read references to locations in the page bypass the on-chip caches. This bit is indicated on the system interface during references to external memory.

The R-bit is the Referenced bit indicator. MMU 18 sets the R-bit in the PTE to 1 whenever it uses the PTE and the R-bit is 0.

The M-bit is the Modified bit indicator; it appears only in second level PTEs. MMU 18 sets the M-bit in the PTE to 1 whenever a write is performed to the page and the M-bit in the PTE is 0.

The SW field is available for use by software. Because these bits are located in the same byte as the M-bit, they must be altered by software using the Clear Bit Interlocked CBITIi and Set Bit SBITi instructions in a multiprocessor environment.

The PFN field is the physical Page Frame Number. It contains the high-order 20 bits of physical address.

TABLE 10

| 31    12 | 11    9 | 8 | 7 | 6 | 5    3 | 2    1 | 0 |
|---|---|---|---|---|---|---|---|
| PFN | SW | M | R | CI | ////// | PL | V |

A trapping condition is recognized for integer arithmetic overflow. Trap (OVF) is enabled by the V-flag in the PSR. This trap is important because detection of integer overflow conditions is required for certain programming languages, such as ADA, and the PSR flags do not indicate the occurrence of overflow for Arithmetic Shift ASHi, Divide DIVi and Multiply MULi instructions.

When an attempt is made to execute an instruction with either of the following two undefined uses of general addressing modes, trap (UND) occurs:

1. Immediate addressing mode is used for an operand that has access class different from read; or
2. Scaled Indexing is used and the basemode is also Scaled Indexing.

The V-flag in the PSR enables trap (OVF) to occur following execution of an integer arithmetic instruction whose results cannot be represented exactly in the destination operand's location.

If the precision required to represent the resulting quotient of a DEI instruction exceeds half the precision of the destination by 2 or more bits, then the quotient and remainder stored in the destination are incorrect. If the precision required to represent the resulting quotient of a Divide Extended Integer DEI instruction exceeds half the precision of the destination by 1 bit, then the quotient stored in the destination is incorrect but the remainder stored is correct.

The V-flag in the PSR also enables trap (OVF) to occur following execution of an ASHi instruction whose result cannot be represented exactly in the destination operand's location.

The V-flag in the PSR also enables trap (OVF) to occur following execution of a Bounds Check Instruction CHECKi whose source operand is out of bounds.

The V-flag in the PSR also enables trap (OVF) to occur following execution of an Add, Compare and Branch instruction ACBi if the sum of the inc value and the index operand cannot be represented exactly in the index operand's location.

The Configuration Register, User Stack Pointer, and Debug Registers can be loaded and stored using privileged forms of the LPRi load and SPRi store instructions.

The contents of the on-chip Instruction Cache 14 and Data Cache 16 can be invalidated by executing the privileged Cache Invalidate instruction CINV. While executing the CINV instruction, CPU 10 generates 2 slave bus cycles on the system interface to display the first 3 bytes of the instruction and the source operand. External circuitry can thereby detect the execution of the CINV instruction for use in monitoring the contents of the on-chip caches.

While executing an LMR instruction, CPU 10 generates 2 slave bus cycles on the system interface to display the first 3 bytes of the instruction and the source operand. External circuitry can thereby detect the execution of an LMR instruction for use in monitoring the contents of Translation Buffer.

As in MMU 18, the F-flag in the PSR is set and no abort occurs when the RDVAL or WRVAL instruction is executed and the location's protection level in the level-1 PTE indicates that the access is not allowed. (In MMU 18, an abort occurs when the location's level-1 PTE is invalid, regardless of the protection level.)

The CINV instruction invalidates the contents of locations in Instruction Cache 14 and Data Cache 16. The instruction can be used to invalidate either the entire contents of the cache or only a 16-byte block. In the latter case, the 28 most-significant bits of the source operand specify the physical address of the aligned 16-byte block; the 4 least-significant bits of the source operand are ignored. If the specified block is not located in the cache, then the instruction has no effect. The instruction refers to Instruction Cache 14 according to an I-option and to Data Cache 16 according to a D-option.

The LMR instruction copies the contents of the SRC operand to the Memory Management register specified by mmureg. The short field of the basic instruction holds a four-bit value that selects the corresponding Memory Management registers as shown in Table 11 below.

TABLE 11

| REGISTER | mmureg | short field |
|---|---|---|
| Feature Enable Word | FEW | 1001 |
| Abort Status Register | ASR | 1010 |
| Translation Exception Address Reg | TEAR | 1011 |
| Page Table Base Register 0 | PTE0 | 1100 |
| Page Table Base Register 1 | PTB1 | 1101 |
| Invalidate Virtual Address 0 | IVAR0 | 1110 |
| Invalidate Virtual Address 1 | IVAR1 | 1111 |

The LPRi instruction can be used to load the User Stack Pointer, Configuration Register, and Debug Registers in addition to the six registers listed in Table 12. Access to these 6 registers is privileged.

TABLE 12

| REGISTER | procreg | short field |
|---|---|---|
| Debug Condition Register | DCR | 0001 |
| Breakpoint Program Counter | BPC | 0010 |
| Debug Status Register | DSR | 0011 |
| Compare Address Register | CAR | 0100 |
| User Stack Pointer | USP | 1011 |
| Configuration Register | CFG | 1100 |

The SMR instruction copies the contents of the Memory Management register specified by mmureg to the double-word destination operand location. The short field of the basic instruction holds a four-bit value that selects the corresponding Memory Management registers as shown in Table 13 below.

TABLE 13

| REGISTER | mmureg | short field |
|---|---|---|
| Feature Enable Word | FEW | 1001 |
| Abort Status Register | ASR | 1010 |
| Translation Exception Address Reg | TEAR | 1011 |
| Page Table Base Register 0 | PTB0 | 1100 |
| Page Table Base Register 1 | PTB1 | 1101 |

The SPRi instruction can be used to store the User Stack Pointer, Configuration Register, and Debug Registers in addition to the six processor registers listed in Table 14. Access to these 6 registers is privileged.

TABLE 14

| REGISTER | procreg | short field |
|---|---|---|
| Debug Condition Register | DCR | 0001 |
| Breakpoint Program Counter | BPC | 0010 |
| Debug Status Register | DSR | 0011 |
| Compare Address Register | CAR | 0100 |
| User Stack Pointer | USP | 1011 |
| Configuration Register | CFG | 1100 |

Referring again to FIG. 3, Bus Interface Unit (BIU) 20 controls the bus cycles for references by Instruction Cache 14, Address Unit 30 and Execution Unit 32. BIU 20 contains a 3-entry buffer for external references. Thus, for example, BIU 20 can be performing a bus cycle for an instruction fetch while holding the information for another bus cycle to write to memory and simultaneously accepting the next data read.

Register File 34 is dual-ported, allowing read access by Address Unit 30 on the GCBUS bus and read/write access by Execution Unit 32 on the GNA bus. Register File 34 holds the general-purpose registers, dedicated registers, and program counter values for Address and Execution Units 30 and 32, respectively.

Figure 5:
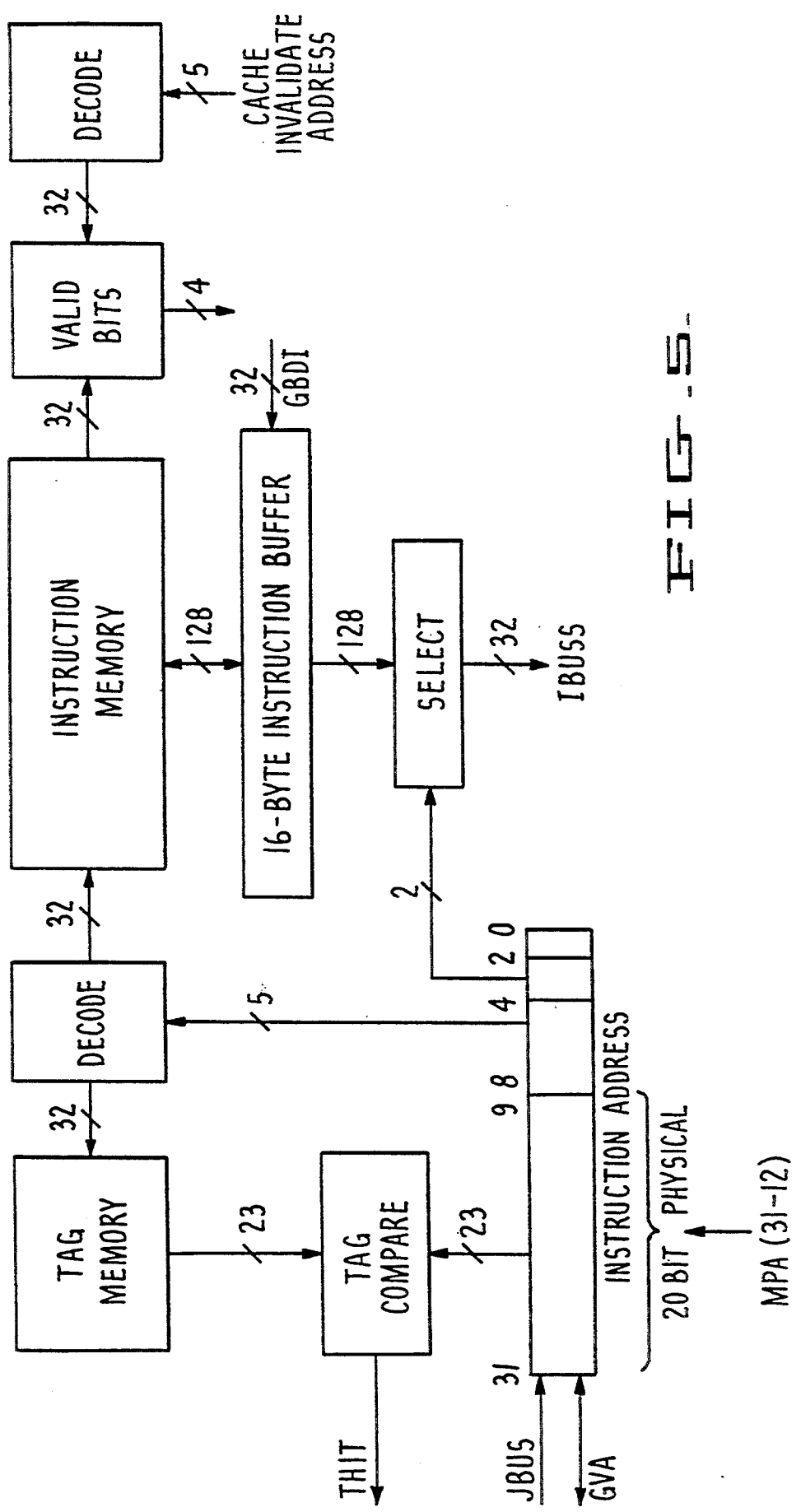
FIG. 5 is a schematic block diagram illustrating the structure of the Instruction Cache of the microprocessor described herein.

Instruction Cache 14 stores 512 bytes in a direct-map organization, as shown in FIG. 5. Bits 4 through 8 of a reference instruction's address select 1 of 32 sets. Each set contains 16 bytes and a log that holds address tags comprising the 23 most-significant bits of the physical address for the locations stored in the set. A valid bit is associated with every double-word.

Instruction Cache 14 also includes a 16-byte instruction buffer from which it can transfer 32-bits of code per cycle on the IBUS to Loader 28. In the event of a hit, the instruction buffer is loaded from the selected set of Instruction Cache 14. In the event of a miss, Instruction Cache 14 transfers the address of the missing double-word on the GVA bus to MMU 18, which translates the address for BIU 20. BIU 20 initiates a burst read cycle to load the instruction buffer from external memory through the GBDI bus. The instruction buffer is then written to one of the sets of Instruction Cache 14.

Instruction Cache 14 includes a 23 bit physical address register which holds the address translation for the last referenced page. If the next reference is to the same page, which will be true in most cases, then there is no need for a translation by MMU 18 and the physical address to be compared with the appropriate Instruction Cache address tag is taken from the physical address register. This eliminates some of the load on MMU 18. If the next reference is to a new page, then a translation request is issued to MMU 18. After the request is acknowledged, Instruction Cache 14 sends the virtual address to MMU 18 over the GVA bus, receives the translation back over the MPA bus and stores the translation in the physical address register.

Instruction Cache 14 references double words while Loader 28 reads a varying number of bytes. In addition, unless buffering is used between Instruction Cache 14 and Loader 28, Loader 28 would stop on any Instruction Cache miss. Therefore, as stated above, Loader 28 includes an 8-byte instruction queue for holding code characters received from Instruction Cache 14. Loader 28 can read 1–4 bytes form the instruction queue.

Instruction Cache 14 holds counters for both the virtual and physical addresses from which to prefetch the next double-word of the instruction stream. When Instruction Cache 14 must begin prefetching from a new instruction stream, the virtual address for the new stream is transferred to it from Loader 28 on the JBUS. When crossing to a new page, Instruction Cache 28 transfers the virtual address to MMU 18 on the GVA bus and receives back the physical address on the MPA bus.

Instruction Cache 14 supports an operating mode to lock its contents to fixed locations. This feature is enabled by setting the Lock Instruction Cache (LIC) bit in the Configuration Register. It can be used in real-time systems to allow fast, on-chip access to the most critical routines. Instruction Cache 14 can be enabled by setting the Instruction Cache Enable (IC) bit in the Configuration Register.

Data Cache 16 stores 1024 bytes of data in a two-way set associative organization, as shown in FIG. 6. Every set has two entries containing 16 bytes and two tags that hold the 23 most significant bits of the physical address for the locations stored in the two entries. A valid bit is associated with every double-word of data.

The timing to access Data Cache 16 is shown in FIG. 7. First, virtual address bits 4 through 8 on the GVA bus are used to select the appropriate set and to read the two entries. Simultaneously, MMU 18 is translating the virtual address and transferring the physical address to Data Cache 16 and BIU 20 on the MPA bus. Then Data Cache 16 compares the two address tags with the physical address while BIU 20 initiates a bus cycle to read the data from external memory. If the reference is a hit, then the selected data is aligned by Data Cache 16 and transferred to Execution Unit 32 on the GDATA bus and BIU 20 cancels the bus cycle but does not assert the BMT and $\overline{\text{CONF}}$ signals. If the reference is a miss, BIU 20 completes the external bus cycle and transfers data from main memory to Execution Unit 32 and Data Cache 16, which updates the cache entry. For references that hit, Data Cache 16 can sustain a throughput of one double-word per cycle, with a latency of 1.5 cycles.

Data Cache 16 is a write-through cache. For memory write references, Data Cache 16 examines whether the reference is a hit. If so, the contents of the cache are updated. In the event of either a hit or a miss, BIU 20 writes the data through to external memory.

Data Cache 16 supports an operating mode to lock its contents to fixed locations. This feature is enabled by setting the Lock Data Cache (LDC) bit in the Configuration Register. It can be used in real-time systems to allow fast on-chip access to the most critical data locations. Data Cache 16 can be enabled by setting the Data Cache Enable (DC) bit in the Configuration Register.

Figure 8:
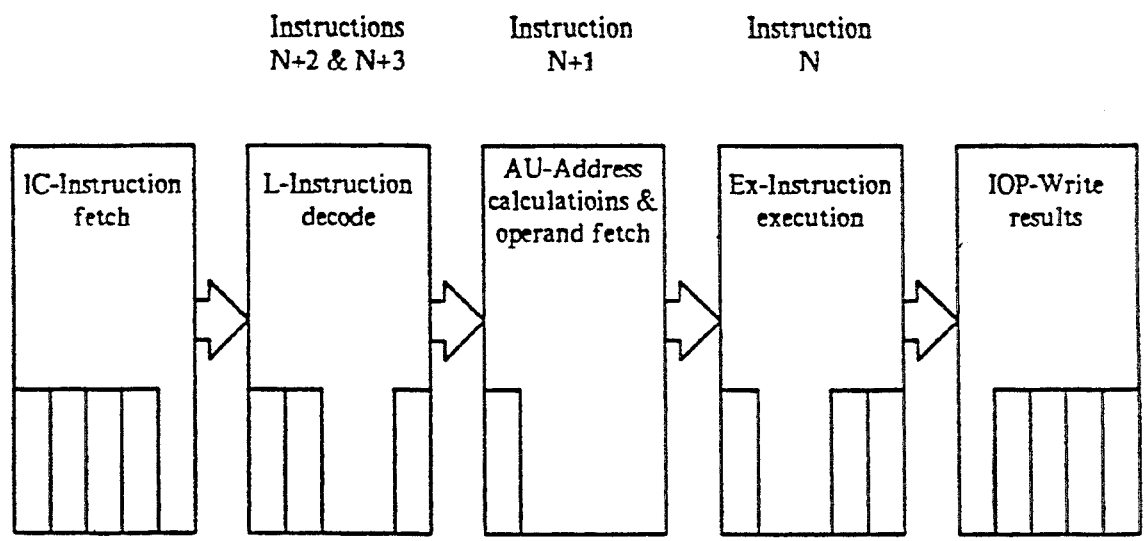
FIG. 8 is a schematic diagram illustrating the structure of the 4-stage instruction Pipeline of the microprocessor described herein.

As stated above, CPU 10 overlaps operations to execute several instructions simultaneously in 4-stage instruction Pipeline 12. The structure of Pipeline 12 and the various buffers for instructions and data are shown generally in FIG. 8. While Execution Unit 32 is calculating the results for one instruction, Address Unit 30 can be calculating the effective addresses and reading source operands for the following instruction, and Loader 28 can be decoding a third instruction and prefetching a fourth instruction into its 8-byte queue.

CPU 10 implements a unique method for completing instructions without waiting for writes to memory. This is done by performing a precheck of the write permission simultaneously with the previous instruction execution and then writing to an internal buffer. When a write access is requested, Address Unit 30 issues a probe request to MMU 18 and saves the virtual write address. Once MMU 18 has acknowledged the request, the write address is provided to MMU 18 on the GVA bus. MMU 18 translates the virtual address to determine whether the referenced page is present in physical memory and if there is write permission to that page. If write permission exists, then a "valid" signal is asserted. If write permission does not exist, then a "stop" signal is asserted. When Execution Unit 32 executes the instruction, it examines the two signals. If the "stop" signal is asserted, then Execution Unit 32 suspends execution of the instruction and processes an abort trap. If the "valid" signal is asserted, then Execution Unit 32 writes the data to its internal write buffer, completes the instruction handling and continues to execution of the next instruction. A write request is then issued by Execution Unit 32 to MMU 18 for the data held in the write buffer. Once acknowledged, Address Unit 30 sends the appropriate address over the GDATA bus. As stated above, the instruction flow is halted only if the write buffer is full.

Address Unit 30 and Execution Unit 32 can process instructions at a peak rate of two cycles per instruction. Loader 28 can process instructions at a peak rate of one cycle per instruction. Therefore, Loader 28 will typically maintain a steady supply of instructions to Address Unit 30 and Execution Unit 32. Loader 28 disrupts the throughput of Pipeline 12 only when a gap in the instruction stream arises due to a branch instruction or a miss in Instruction Cache 14.

Figure 9:
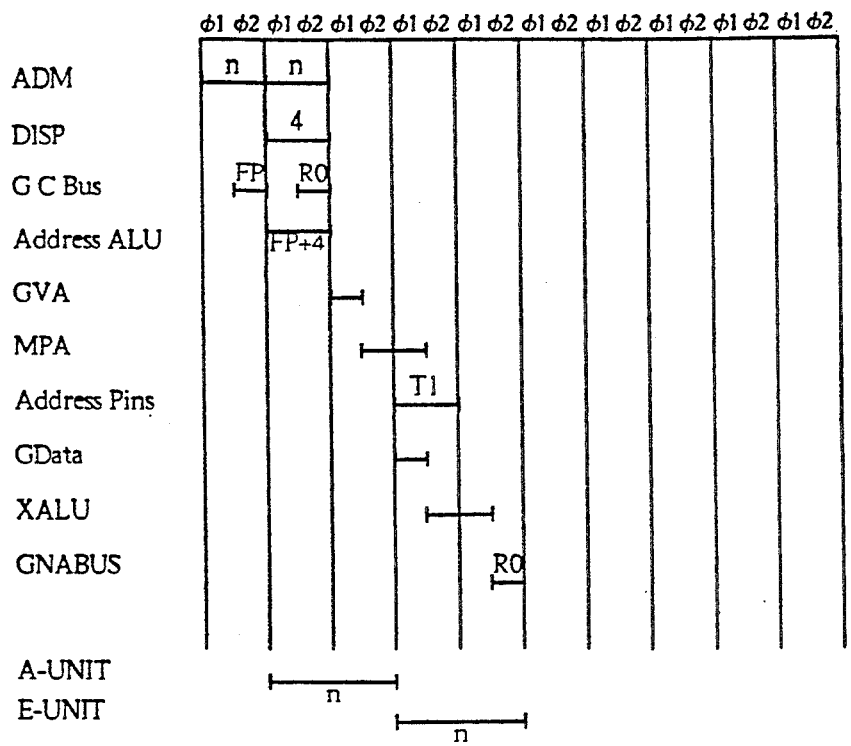
FIG. 9 is a timing diagram illustrating Pipeline timing for an internal Data Cache hit for the microprocessor described herein.

FIG. 9 shows the execution of two memory-to-register instructions by Address Unit 30 and Execution Unit 32. CPU 10 can sustain an execution rate of two cycles for most common instructions, typically exhibiting delays only in the following cases:

1. Storage delays due to cache and translation buffer misses and non-aligned references.
2. Resource contention between stages of instruction Pipeline 12.
3. Branches and other non-sequential instruction fetches.
4. Complex addressing modes like scaled index, and complex operations, like division.

Figure 10:
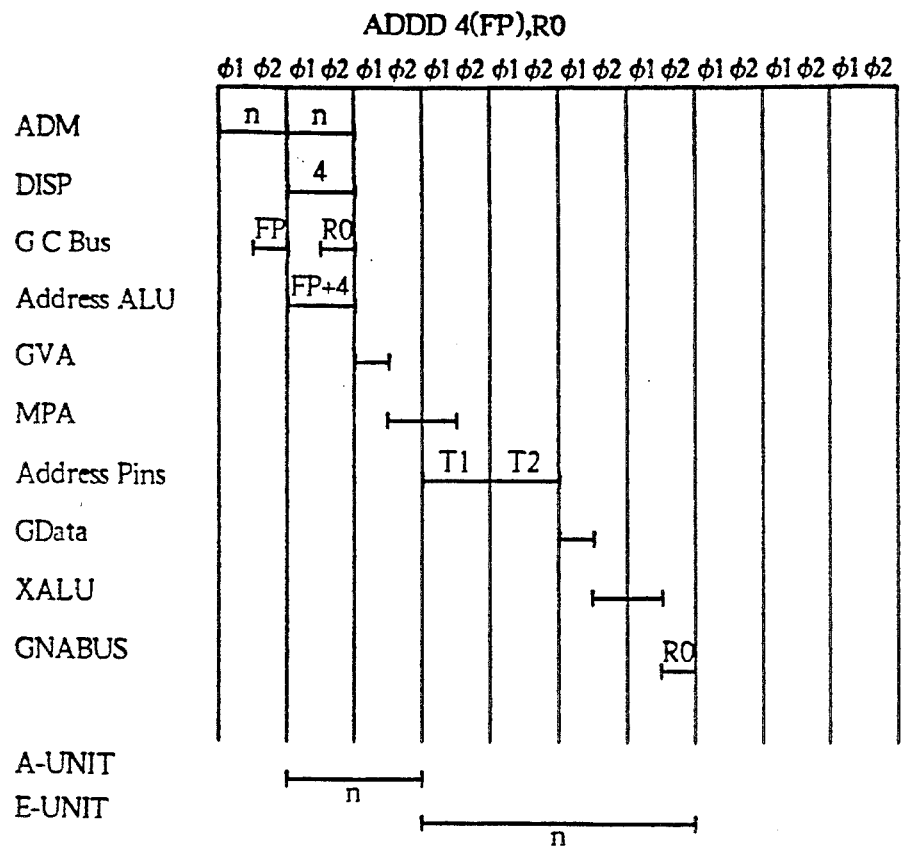
FIG. 10 is a timing diagram illustrating Pipeline timing for an internal Data Cache miss for the microprocessor described herein.

FIG. 10 shows the effect of a Data Cache 16 miss on the timing of Pipeline 12. Execution Unit 32 is delayed by two cycles until BIU 20 completes the bus cycles to read data.

Figure 11:
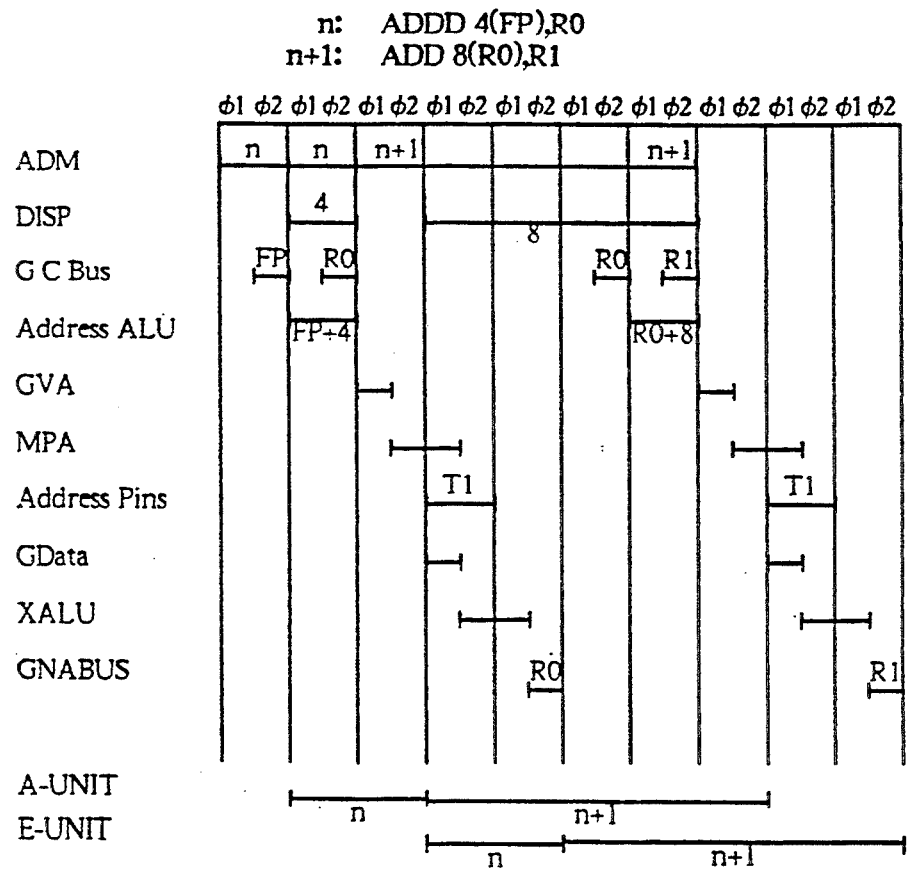
FIG. 11 is a timing diagram illustrating the effect of an address-register interlock on Pipeline timing of the microprocessor described herein.

FIG. 11 shows the effect of an address-register interlock on the timing of Pipeline 12. One instruction is modifying a register while the next instruction uses that register for an address calculation. Address Unit 30 is delayed by three cycles until Execution Unit 32 completes the register's update. Note that if the second instruction had used the register for a data value rather than an address calculation (e.g., ADDD R0, R1), then bypass circuitry in Execution Unit 32 would be used to avoid any delay to Pipeline 12.

Loader 28 includes special circuitry for the handling of branch instructions, as will be discussed in greater detail below. When a branch instruction is decoded, Loader 28 calculates the destination address and selects between the sequential and non-sequential instruction streams. The selection is based on the branch condition and direction. If Loader 28 predicts that the branch is taken, then the destination address is transferred to Instruction Cache 14 on the JBUS. Whether or not the branch is predicted to be taken, Loader 28 saves the address of the alternate instruction stream. Later the branch instruction reaches Execution Unit 32 where the condition is resolved. Execution Unit 32 signals Loader 28 whether or not the branch was taken. If the branch had been incorrectly predicted, Pipeline 12 is flushed, and Instruction Cache 14 begins prefetching instructions from the alternate stream.

Figure 12:
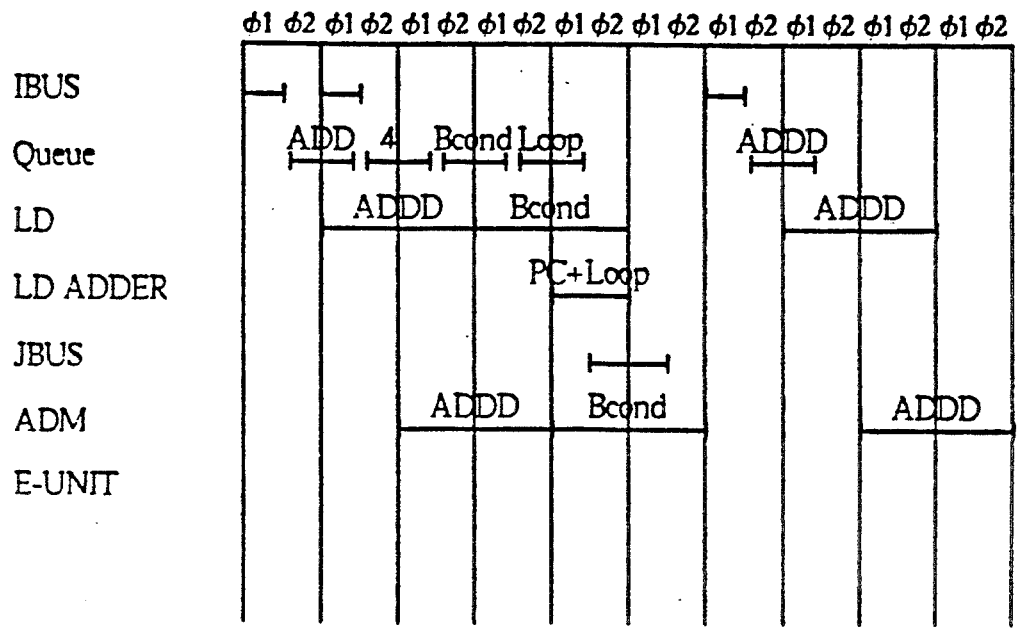
FIG. 12 is a timing diagram illustrating the effect of correctly predicting a branch instruction to be taken in the operation of the microprocessor described herein.

FIG. 12 shows the effect of correctly predicting a branch instruction to be taken. A 2-cycle gap occurs in the decoding of instructions by Loader 28. This gap at the very top of Pipeline 12 can often be closed because one fully decoded instruction is buffered between Loader 28 and Address Unit 30 and because other delays may arise simultaneously at later stages in Pipeline 12.

Figure 13:
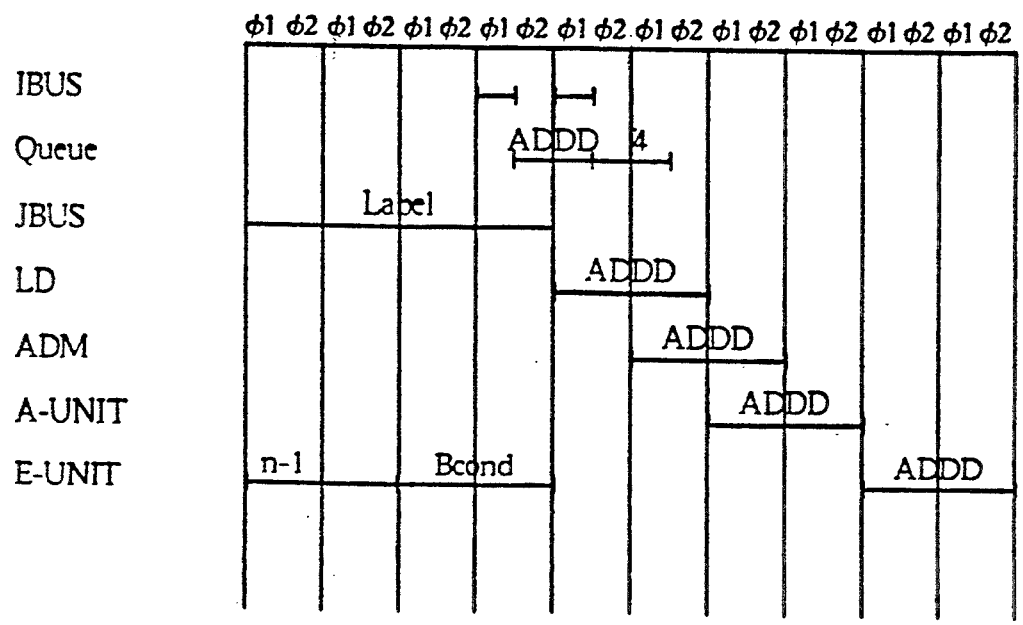
FIG. 13 is a timing diagram illustrating the effect of incorrectly predicting the resolution of a branch instruction in the operation of the microprocessor described herein.

FIG. 13 shows the effect of incorrectly predicting the resolution of a branch instruction. A 4-cycle gap occurs at Execution Unit 32.

The Integer-Overflow trap is enabled by a previously reserved bit in the Program Status Register. When enabled, a trap occurs if (1) the result of an arithmetic operation (like ADD, MUL, or ASH) cannot be represented exactly in the destination or (2) a CHECK instruction detects the source operand to be out of bounds. When a trap occurs, the instruction is completed and control is transferred to an exception service procedure through a new entry in the Interrupt Dispatch Table. Instruction results and flag settings are not affected by enabling an Integer-Overflow trap.

The Direct-Exception Mode is enabled by a control bit in the Configuration Register. When Direct-Exception Mode is enabled, Interrupt Dispatch Table entries contain the addresses of exception service descriptors. The use of Direct-Exception Mode avoids memory accesses, thereby improving interrupt response time.

CPU 10 receives a single-phase input clock CLK which has a frequency twice that of the operating rate of CPU 10. For example, the input clock's frequency is 40 MHz for a CPU 10 operating at 20 MHz. CPU 10 divides the CLK input by two to obtain an internal clock that is composed of two non-overlapping phases, PHI1 and PHI2. CPU 10 drives PHI1 on the BUSCLK output signal.

Figure 14:
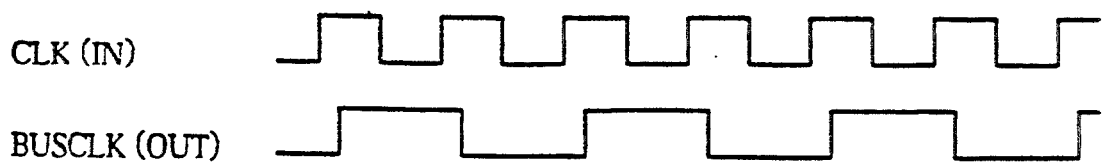
FIG. 14 is a timing diagram illustrating the relationship between the CLK input and BUSCLK output signals of the microprocessor described herein.

FIG. 14 shows the relationship between the CLK input and BUSCLK output signals.

Figure 15:
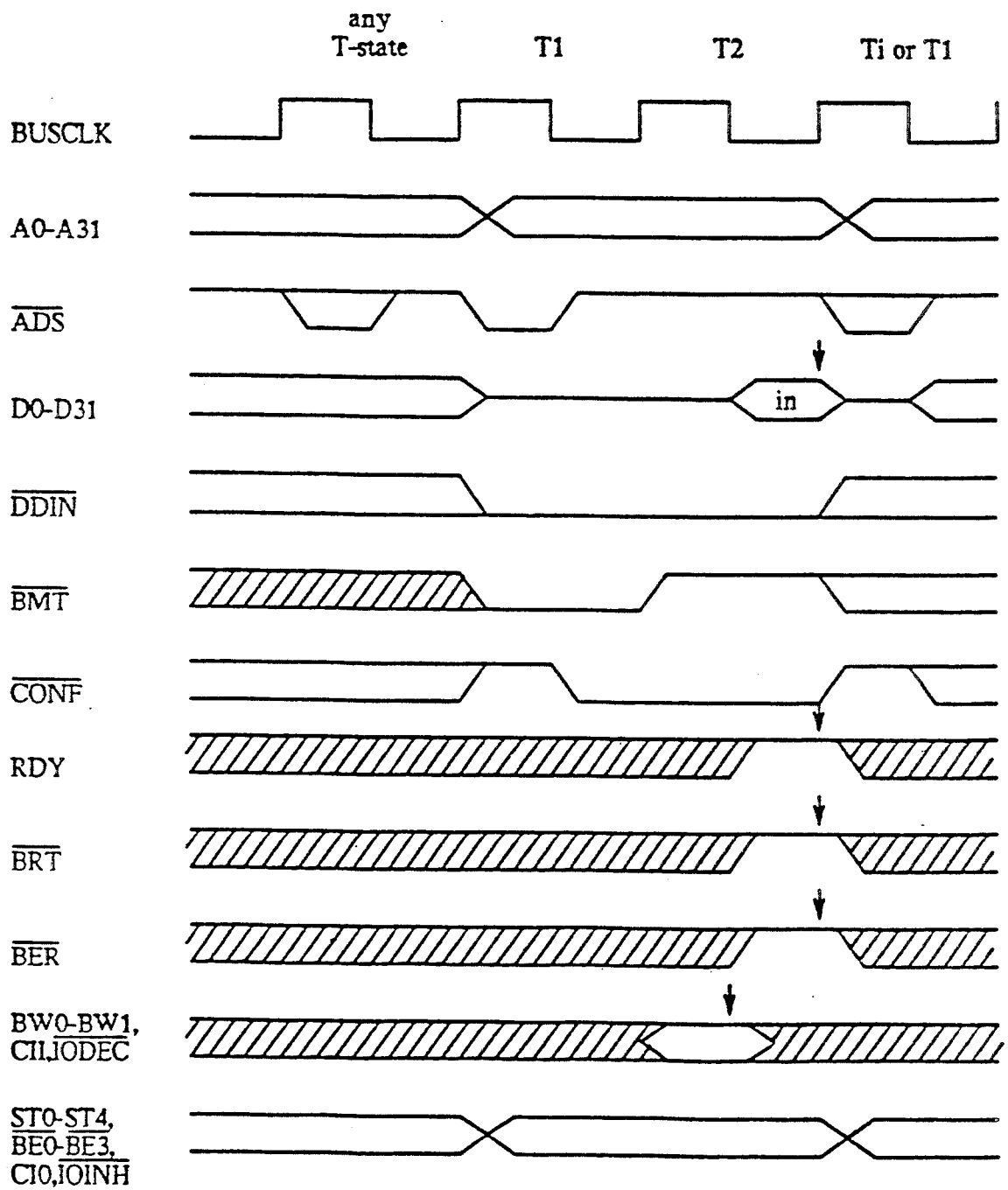
FIG. 15 is a timing diagram illustrating the basic read cycle of the microprocessor described herein.

As illustrated in FIG. 15, every rising edge of the BUSCLK output defines a transition in the timing state ("T-state") of CPU 10. Bus cycles occur during a sequence of T-states, labelled T1, T2, and T2B in the timing diagrams. There may be idle T-states (Ti) between bus cycles. The phase relationship of the BUSCLK output to the CLK input can be established at reset.

The basic bus cycles performed by CPU 10 to read from and write to external main memory and peripheral devices occur during two cycles of the bus clock, called T1 and T2. The basic bus cycles can be extended beyond two clock cycles for two reasons. First, additional T2 cycles can be added to wait for slow memory and peripheral devices. Second, when reading from memory, burst cycles (called "T2B") can be used to transfer multiple double-words from consecutive locations.

Figure 16:
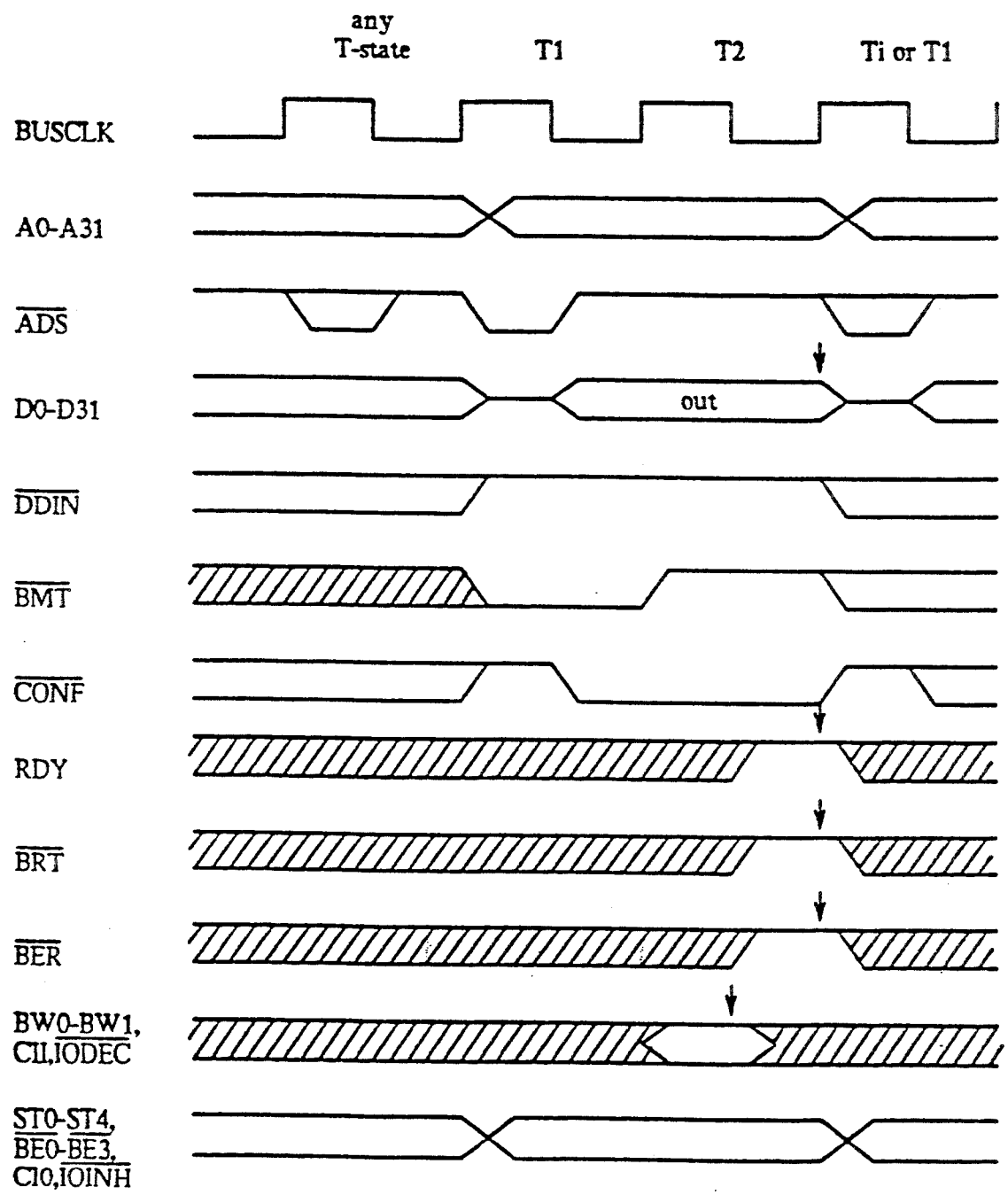
FIG. 16 is a timing diagram illustrating the basic read write cycle of the microprocessor described herein.

The timing for basic read and write bus cycles with no "wait" states is shown in FIGS. 15 and 16, respectively. For both read and write bus cycles, CPU 10 asserts Address Strobe $\overline{\text{ADS}}$ during the first half of T1 indicating the beginning of the bus cycle. From the beginning of T1 until the completion of the bus cycle, CPU 10 drives the Address Bus and control signals for the Status (ST0-ST4), Byte Enables (BE0-BE3), Data Direction In ($\overline{\text{DDIN}}$), Cache Inhibit (CIO), I/O Inhibit ($\overline{\text{IOINH}}$), and Cache Section (CASEC) signals.

If the bus cycle is not cancelled (that is, T2 will follow on the next clock), CPU 10 asserts Begin Memory Transaction $\overline{\text{BMT}}$ during T1 and asserts Confirm Bus Cycle $\overline{\text{CONF}}$ from the middle of T1 until the completion of the bus cycle, at which time $\overline{\text{CONF}}$ is negated.

At the end of T2, CPU 10 samples that RDY is active, indicating that the bus cycle has completed; that is, no additional T2 states should be added. Following T2 is either T1 for the next bus cycle or Ti, if CPU 10 has no bus cycles to perform.

Figure 17:
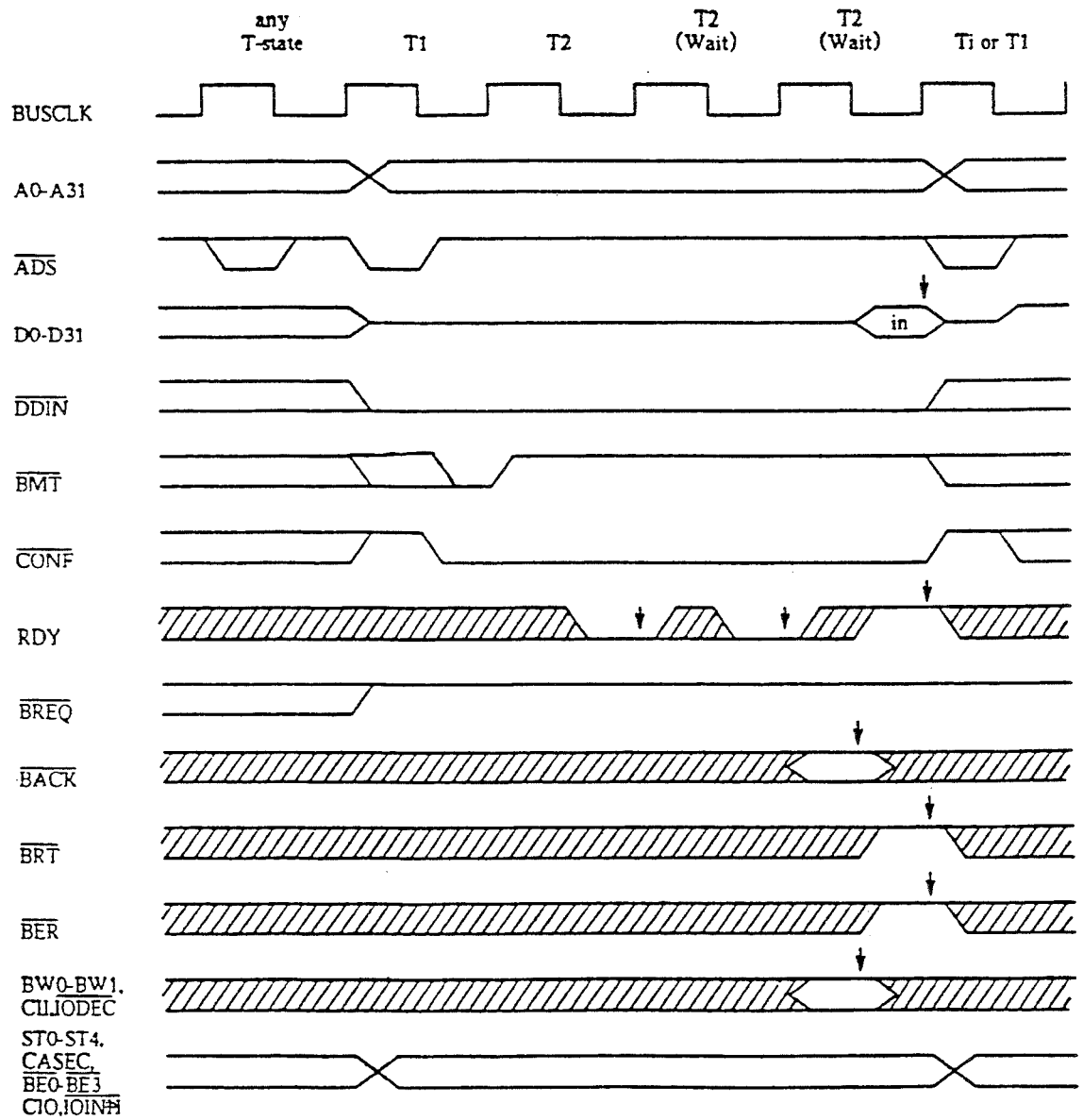
FIG. 17 is a timing diagram illustrating a read cycle of the microprocessor described herein extended with two wait cycles.

As shown in FIG. 17, the basic read and write bus cycles previously described can be extended to support longer access times. As stated, CPU 10 samples RDY at the end of each T2 state. If RDY is inactive, then the bus cycle is extended by repeating T2 for another clock. The additional T2 states after the first are called "wait" states. FIG. 17 shows the extension of a read bus cycle with the addition of two wait states.

As shown in FIG. 18, the basic read cycles can also be extended to support burst transfers of up to four double-words from consecutive memory locations. During a burst read cycle, the initial double-word is transferred during a sequence of T1 and T2 states, like a basic read cycle. Subsequent double-words are transferred during states called "T2B". Burst cycles are used only to read from 32-bit wide memories.

The number of transfers in a burst read cycle is controlled by a handshake between the output signal Burst Request $\overline{BREQ}$ and the input signal Burst Acknowledge $\overline{BACK}$ during a T2 or T2B state to indicate that it requests another transfer following a current one. The memory asserts $\overline{BACK}$ to indicate that it can support another transfer. FIG. 18 shows a burst read cycle of three transfers in which CPU 10 terminates the sequence by negating $\overline{BREQ}$ after the second transfer. FIG. 19 shows a burst cycle of two transfers terminated by the system when $\overline{BACK}$ was inactive during the second transfer.

For each transfer after the first in the burst sequence, CPU 10 increments address bits 2 and 3 to select the next double-word. As shown for the second transfer in FIG. 19, CPU 10 samples RDY at the end of each state T2B and extends the access time for the burst transfer if RDY is inactive.

CPU 10 initiates and terminates burst read cycles as follows: CPU 10 initiates a burst read cycle whenever fetching an instruction and the address does not select the last double double-word in an aligned 16-byte cache block. CPU 10 continues the burst cycle until the last double-word in an aligned 16-byte block has been transferred or CPU 10 terminates the burst.

CPU 10 initiates a burst read cycle to read data when both of the following conditions are true:
1. Data Cache 16 is enabled and not locked (DC=1 and LDC=0 in the Configuration Register); and
2. The addressed page is cacheable, as indicated by the level-2 PTE.

CPU 10 continues the burst cycle for a data read until four double-words have been transferred or CPU 10 terminates the burst. The double words are transferred within an aligned 16-byte block in a wrap-around order. For example, if a source operand is specified in Frame Memory at effective address 104, then the burst read cycle transfers the double words at 104, 108, 112, and 100, in that order.

A burst cycle initiated by CPU 10 can be terminated in any of the following ways:
1. By negating $\overline{BACK}$ during any T2 or T2B cycle. CPU 10 uses the value of $\overline{BACK}$, sampled when RDY is high, to determine whether to continue the burst cycle.
2. By indicating on BW0–BW1 that the bus width is not 32 bits. CPU 10 uses the value of BW0–BW1, sampled when RDY is high, to determine whether burst cycles are supported. The bus width must remain fixed for any aligned 16-byte block.
3. By asserting $\overline{BRT}$ or $\overline{BER}$ during an T2 or T2B of the burst cycle. CPU 10 uses the value of $\overline{BRT}$ or $\overline{BER}$, sampled at the end of the T2 or T2B state, to determine whether to continue the burst cycle.

CPU 10 supports indivisible read-modify-write operations by asserting $\overline{ILO}$ during consecutive read and write bus cycles. Such interlocked bus cycles are important for shared-memory multiprocessor systems. CPU 10 uses an interlocked bus cycle for data references while executing a CBITI or SBITI instruction and while MMU 18 is updating a level-2 PTE.

Variable data bus widths can be used in systems which work dynamically with different data bus width, as the program flows. For this purpose, there are two input pins: BW0 and BW1. These two pins are sampled by CPU 10 at the middle of T2. Based on this sampling, CPU 10 decides whether to make more cycles on the bus with the proper address.

The BE and Data lines are always activated according to the 32-bit bus width of the system. External logic must generate Special Bytes Enable (SBE) for bus widths less than 32 bits.

If CPU 10 detects a combination on the Bus Width pins that indicates a lower bus width than it needs, it performs more cycles. In the extra cycles, CPU 10 will change the Bus Enable pins according to the Bus Width pins and the Bus Width pins will be ignored.

On write cycles, CPU 10 also places the data on the Least-Significant-Bits of the data bus; i.e., duplicating the data. The Bus Enable pins are activated according to the exact byte address and the length of the written operand.

CPU 10 read cycles are designed to support internal Data Cache 16. When cacheable data is read, Data Cache 16 stores full double-word quantities to a maximum of four double-words at a time. All reads begin by sending the exact byte address, i.e., the address of the LS Byte of the operand, with all Bus Enable bits active. Usually, the bus will be 32 bits wide and the entire double-word will be read. However, special cases occur when the bus width is not 32 bits. For a cacheable read on a 16 bit bus, the double word will be read in two cycles; the first word will contain the requested byte address. For a non-cacheable read on a 16 bit bus, only the requested information will be read according to the operand length. For a cacheable read on an 8 bit bus, CPU 10 issues the exact byte address and reads the rest of the double-word, one byte at a time, in cyclic order. For a non-cacheable read on an 8 bit bus, CPU will only read the needed information according to the operand length.

During interlocked read and write bus cycles to execute a CBITI or SBITI instruction, CPU 10 activates only the Byte Enable signal for the byte containing the modified bit. During interlocked read and write bus cycles to update a level-2 Page Table Entry, CPU 10 activates only the Byte Enable signals for the aligned word containing the R and M bits of the PTE.

CPU 10 can relinquish its access to the system bus upon request from a Direct Memory Access unit (DMA) or another CPU. This capability is implemented on the Hold Request HOLD and Hold Acknowledge HLDA pins. By asserting HOLD low, an external device request access to the bus. On receipt of HLDA from CPU 10, the external device may perform the bus cycle, since CPU 10 at this point has set its bus to tristate. To return control of the bus to CPU 10, the external device sets HOLD inactive and CPU 10 acknowledges return of the bus by setting HLDA inactive.

CPU 10 provides several mechanisms for maintaining data coherency between the two on-chip caches i.e., Instruction Cache 14 and Data Cache 16, and external memory. These techniques are summarized in Table 16.

TABLE 16

|  | SOFTWARE | HARDWARE |
| --- | --- | --- |
| Inhibit Cache Access for certain locations | Cache-Inhibit bit in PTE | Cache-Inhibit input signal |
| Invalidate certain locations in Cache | CINV Instruction to invalidate block | Cache Invalidation request to invalidate set |
| Invalidate Entire Cache | CINV Instruction | Cache Invalidation request |

The use of caches can be inhibited for individual pages using the CI bit in the level-2 PTE.

The coherency between the on-chip caches of CPU 10 and external memory may also be ensured by using an external "Bus Watcher" 26, shown in FIG. 1. This circuit interfaces to the following buses:

1. CPU 10 Address Bus and CASEC output, to get information on which internal cache entries (tags) are modified and to maintain updated copies of CPU 10 internal cache tags;
2. The System Bus, to detect which internal memory addresses are modified; and
3. CPU 10 Cache Invalidation Bus, consisting of $\overline{INV}$ $\overline{SET}$, $\overline{INVDC}$, $\overline{INVIC}$ and CIA0-CIA6 signals.

The contents of Instruction Cache 14 and Data Cache 16 can be invalidated through external requests. It is possible do invalidate a single set or all sets in the either or both caches. The input signals INVIC and INVDC request invalidation of Instruction Cache 14 and Data Cache 16, respectively. The input signal INSET indicates whether the invalidation applies to a single set or to the entire cache. When only a single set is invalidated, the set number is specified on the CIA input bus.

If the invalidation request occurs prior to or at the same time that CPU 10 is completing a T2 or T2B state in a read cycle for a cache location affected by the invalidation, the data read on the bus will be valid in the cache! If the invalidation request occurs after the T2 or T2B state in the read cycle, the data will be invalid in the cache.

The pins which control cache invalidation are multiplexed with certain testing function. The input signal CINVE is driven low to select use of these pins for cache invalidation. Otherwise, if CINVE is high, the pins are used for testing.

Bus Watcher 26 maintains copies of Instruction Cache 14 and Data Cache 16 address tags. If the address of a memory write cycle on the System Bus matches one of the tags inside Bus Watcher 26, a command will be issued by Bus Watcher 26 to CPU 10, via the Cache Invalidation Bus, to invalidate the corresponding entry in the internal cache. The invalidation of the internal cache entry by CPU 10 takes one clock cycle only and does not interfere with an on-going bus cycle of CPU 10. The techniques implemented by CPU 10 for maintaining cache coherence are described in copending and commonly-assigned U.S. patent application Ser. No. 006,015, "Method of Maintaining Coherence Between a Microprocessor's Integrated Cache and External Memory", filed by Shacham et al. of even date herewith, and which is hereby incorporated by reference.

To execute an instruction, CPU 10 first fetches the instruction the address of which is contained in the Program Counter and then performs the operations for that particular instruction. After executing the instruction, the Program Counter is updated in one of two ways to contain the address of the next instruction to execute: either the current instruction explicitly loads the Program Counter (like JUMP) or the Program Counter is incremented by the length of the current instruction.

CPU 10 has five operating states regarding the execution of instructions and the processing of exceptions: reset, executing instructions, processing an exception, waiting for an interrupt and halted.

While executing an instruction, if CPU 10 recognizes an exception, it saves the PC, PSR and MOD contents of the Program Counter Register, Program Status Register and Module Register, then begins executing an exception service procedure.

Exceptions are conditions, events and errors that alter the normal sequence of instruction execution. CPU 10 recognizes four types of exception: reset, bus errors, interrupts and traps. A reset exception occurs when the $\overline{RST}$ signal is activated; reset is used to initialize CPU 10. A bus error exception occurs when the $\overline{BER}$ signal is activated in response to an instruction fetch or data transfer required by CPU 10 to execute an instruction. An interrupt occurs in response to an event signalled by activating the $\overline{NMI}$ or $\overline{INT}$ signals; interrupts are typically requested by peripheral devices that require the attention of CPU 10. A trap occurs when certain conditions, such as a divisor of 0, are detected by CPU 10 during execution of an instruction.

Whenever the $\overline{RST}$ input signal is activated, CPU 10 enters the reset state. CPU 10 remains in the reset state until the $\overline{RST}$ signal is driven inactive, at which time it enters the state of executing instructions. While CPU 10 is in the reset state, the contents of certain dedicated registers are initialized.

CPU 10 provides information on the system interface bus concerning its internal activity. The U/$\overline{S}$ signal indicates whether CPU 10 is operating in User Mode or Supervisor Mode. The PFS signal is activated for one clock cycle when CPU 10 begins executing a new instruction. The ISF signal is driven low along with PFS if the new instruction follows the previous instruction in sequence. The BP signal is activated along with PFS to indicate that a PC-match debug condition was detected for the previous instruction; an address-compare debug condition is indicated when the BP signal is activated while PFS is inactive. During idle cycles, the signals ST0-ST4 indicate whether CPU 10 is waiting for an interrupt or is waiting for a slave processor to complete executing an instruction or has halted.

While in the state of executing instruction, CPU 10 continues to execute instructions until an exception is recognized or the WAIT instruction is executed. When an exception other than reset is recognized, CPU 10 enters the state of processing an exception. Following execution of the WAIT instruction, CPU 10 enters the state of waiting for an interrupt.

As stated above, while in the state of processing an exception, CPU 10 is saving the PC, PSR and MOD contents and reading the PC and module linkage values to begin execution of the exception service procedure. For processing an interrupt, CPU 10 additionally reads one or two vector values from ICU 24. Following the successful completion of all data references required to process an exception, CPU 10 enters the state of executing instructions. If, however, a bus error or abort is detected while CPU 10 is processing an exception, it enters the halted state.

In the state of waiting for an interrupt, CPU 10 is idle. A special status identifying this state is presented on the system interface. When an interrupt or an external debug condition is detected, CPU 10 enters the state of processing an exception.

CPU 10 enters the halted state when a bus error or abort is detected while CPU 10 is processing an exception, thereby preventing the transfer of control to an appropriate exception service procedure. A special status identifying this state is presented on the system interface.

CPU 10 performs the following operations to execute an instruction:
fetch the instruction;
read source operands, if any;
calculate results;
write result operands, if any;
modify flags, if necessary; and
update the Program Counter.

Under most circumstances, CPU 10 executes instructions by completing the operations listed above in strict sequence for one instruction and then beginning the sequence of operation for the next instruction. However, exceptions can alter the sequence of operations to execute an instruction or to advance from one instruction to the next. Also, for enhanced performance, as described above, CPU 10 overlaps the operations for executing several instructions in a pipelined manner.

The following discussion explains the effects of exceptions in Pipeline 12 on instruction execution. In this discussion, reads of addresses from memory to calculate effective addresses for memory-relative and external addressing modes are considered like source operands, even if the effective address is being calculated for an operand with access class of write.

CPU 10 checks for exceptions at various points during the execution of an instruction. When an exception is recognized, the instruction being executed ends in one of four possible ways: it is completed, suspended, terminated or partially completed. Each of the four types of exception causes a particular ending.

When an exception is recognized after an instruction is completed, CPU 10 has performed all of the operations for that instruction and for all other instructions executed since the last exception occurred. Result operands have been written, flags have been modified, and the PC saved on the Interrupt Stack contains the address of the next instruction to execute. The exception service procedure can, at its conclusion, execute an appropriate return instruction and CPU 10 will begin executing the instruction following the completed instruction.

An instruction is suspended when one of several trapping conditions or a restartable bus error is detected during execution of the instruction. A suspended instruction has not been completed, but all other instructions executed since the last exception occurred have been completed. Result operands and flags due to be effected by the instruction may have been modified, but only modifications that allow the instruction to be executed again and completed can occur. The PC saved on the Interrupt Stack contains the address of the suspended instruction.

For example, the RESTORE instruction pops up to update general-purpose registers from the stack. If an invalid PTE is detected on one of the references to the stack, then the instruction is suspended. The general-purpose registers due to be loaded by the instruction may have been modified, but the stack pointer still holds the same value it did when this instruction began.

To complete a suspended instruction, the exception service procedure takes one of two actions:

1. The service procedure can simulate the suspended instructions execution. After calculating and writing the instructions results, flags in the PSR copy saved on the Interrupt Stack should be modified and the Program Counter saved on the Interrupt Stack should be updated to point to the next instruction to execute. The service procedure can then execute a return instruction and CPU 10 begins executing the instruction following the suspended instruction. This is the action taken when floating-point instructions are simulated by software in systems without a hardware floating-point unit.

2. Suspended instructions can be executed again after the service procedure has eliminated the trapping condition that caused the instruction to be suspended. The service procedure executes a return instruction at its conclusion; then CPU 10 begins executing the suspended instruction again. This is the action taken by a debugger when it encounters a BPT instruction that was temporarily placed in another instructions location in order to set a breakpoint.

Although CPU 10 allows a suspended instruction to be executed again and completed, CPU 10 may have read a source operand or the instruction from a memory-mapped peripheral port before the exception was recognized. In such a case, the characteristic of the peripheral device may prevent correct re-execution of the instruction.

It may be necessary for the exception service procedure to alter the P-flag (Trace Trap Pending flag) in the PSR copy saved on the Interrupt Stack. If the exception service procedure simulates the suspended instruction and the P-flag was cleared by CPU 10 before saving the PSR copy, then the saved T-flag (Trace flag) must be copied to the saved P-flag (like the floating-point instruction simulation described above). Or, if the exception service procedure executes the suspended instruction again and the P-flag was not cleared by the CPU 10 before saving the PSR copy, then the saved P-flag must be cleared (like the breakpoint trap described above). Otherwise, no alteration to the saved P-flag is necessary.

An instruction being executed is terminated when reset or a nonrestartable bus error occurs. Any result operands and flags due to be effected by the instruction are undefined as are the contents of the Program Counter. The result operands of other instructions executed since the last serializing operation may not have been written to memory. A terminated instruction cannot be completed.

When a restartable bus error, interrupt, abort, or debug condition is recognized during execution of a string instruction, the instruction is said to be partially completed. A partially completed instruction has not been completed, but all other instructions executed since the last exception have been completed. Result operands and flags due to be effected by the instruction may have been modified, but the values stored in the string pointers and other general-purpose registers used during the instruction's execution allow the instruction to be executed again and completed.

CPU 10 clears the P-flag in the PSR before saving the copy that is pushed on the Interrupt Stack. The Program Counter saved on the Interrupt Stack contains the address of the partially completed instruction. The exception service procedure can, at its conclusion, simply execute a return instruction and CPU 10 will resume executing the partially completed instruction.

As stated above, CPU 10 overlaps the operations to execute several instructions simultaneously in a 4-stage instruction Pipeline 12. Under certain circumstances, the effects of overlapped instruction execution can differ from those of strictly sequential instruction execution. More specifically, the order of memory references performed by CPU 10 may appear to differ, as explained in greater detail below.

While executing an instruction, CPU 10 may read some of the source operands from memory before completely fetching the instruction. CPU 10, however, always completes fetching an instruction and reading its source operands before writing its results. When more than one source operand must be read from memory to execute an instruction, the operands may be read in any order. Similarly, when more than one result operand is written to memory to executed instruction, the operands may be written in any order.

CPU 10 begins fetching an instruction only after all previous instructions have been completely fetched. However, CPU 10 may begin fetching an instruction before all the source operands have been read and results written for previous instructions.

CPU 10 begins reading the source operands for an instruction only after all previous instructions have been fetched and their source operands read. The source operand for an instruction may be read before all results of the previous instruction have been written, except when the source operand's value depends on the result not yet written. CPU 10 compares the physical address and the length of the source operand with those of any results not yet written and delays reading the source operand until after writing all results on which the source operand depends. Also, CPU 10 insures that the interlock read and write references to execute an SBITIi or CBITIi instruction occur after writing all results of the previous instruction and before reading any source operands for subsequent instructions.

In addition, CPU 10 identifies source operands that are located in memory-mapped peripheral ports and delays the reading of such operands until after all previous results destined for memory-mapped peripheral ports have been written. As described below, special handling insures that read and write references to memory-mapped I/O ports are always performed in the order implied by the program.

CPU 10 begins writing the result operands for an instruction only after all results of previous instructions have been written.

CPU 10 implements two methods for monitoring the sequence of executed instructions. First, an additional interface signal is provided which indicates whether an instruction beginning execution is sequential or non-sequential. Second, additional information is displayed on the interface signals used for external memory references.

The interface signal is called "Internal Sequential Fetch" (ISF). CPU 10 activates the ISF signal, along with a Program Flow Status (PFS) signal, whenever a taken branch or jump instruction is executed.

"Branch" instructions are those instructions that potentially transfer control to an instruction at a destination address calculated by adding a displacement value encoded into the currently executing instruction to the address of the currently executing instruction. Branch instructions can be "unconditional" or "conditional"; in the latter case, a test is made to determine whether a specified condition concerning the state of the microprocessor is true. A branch instruction is said to be "taken" either if it is unconditional or if it is conditional and the specified condition is true.

"Jump" instructions are those instructions that potentially transfer control to an instruction at a destination address calculated in a general manner that depends on the definition of the particular instruction. Examples of common jump instructions are "RETURN", which transfers control to an address that is read from the top of the stack in memory, and "CASE", which transfers control to an address that is located by using an operand's value to index into a table of addresses in memory. Like branch instructions, jump instructions can be "unconditional" or "conditional" and are said to be "taken" either if unconditional or if conditional and the specified condition is true.

The significant distinction between branch and jump instructions is that, for branch instructions, it is possible to calculate the destination address knowing only the instruction's encoding and location, whereas for jump instructions, the destination address generally depends on same data value that can vary, such as the contents of a register or memory location.

It is only necessary for CPU 10 to activate the ISF signal for taken branch instructions. It is, therefore, possible to monitor control flow when a branch instruction is executed. If the branch instruction is taken, which is indicated by driving the ISF signal active, then control is transferred to a destination instruction, the address of which can be calculated knowing the encoding and address of the branch instruction. If the branch is not taken, which is indicated by driving the ISF signal inactive, then control is transferred to the instruction following the branch instruction in memory.

Additional information for monitoring control flow is displayed on the external memory interface only when a taken jump instruction is executed or an exception occurs. When an exception occurs, CPU 10 displays both a code that indicates the type of exception and the virtual address of the exception service procedure. When the taken jump instruction is executed, CPU 10 displays the virtual address of the jump destination. The destination address is displayed after CPU 10 has begun fetching the instruction at the jump destination. The memory interface will typically be idle at this time while CPU 10 is decoding and preparing to execute the instruction at the jump destination. CPU 10 indicates, through status information, when it is displaying either the code for an exception or the destination address for a taken jump instruction rather than making the reference to memory.

The techniques implemented by CPU 10 for monitoring control flow are described in co-pending and commonly-assigned U.S. patent application Ser. No. 006,009, "Monitoring Control Flow in a Microprocessor", filed by Intrater et al. of even date herewith, and which is hereby incorporated by reference.

As a consequence of overlapping the operations for several instructions, CPU 10 may fetch an instruction and read its source operands, although the instruction is not executed (for example, if the previous instruction causes a trap). Nevertheless, when CPU 10 identifies that a source operand for an instruction is located in a memory-mapped peripheral port, then it will read the source operand only if the instruction is executed.

Note that CPU 10 does not check for dependencies between the fetching of an instruction and the writing of previous instructions results. Thus, self-modifying code must be treated specially to execute as intended.

The characteristics of certain peripheral devices and the overlapping of instruction execution in Pipeline 12 of CPU 10 require that special handling be applied to memory-mapped I/O references. I/O references differ from memory references in two significant ways, imposing the following requirements:

1. Reading from a peripheral port can alter the value read on the next reference to the same port, a characteristic called "destructive-reading". For example, serial communication controllers and FIFO buffers commonly operate in this manner. As explained above, CPU 10 can read the source operands for one instruction while the previous instruction is executing. Because the previous instruction may cause a trap, an interrupt may be recognized or the flow of control may be otherwise altered, it is a requirement that destruction-reading of source operands in advance of executing an instruction be avoided.

2. Writing to a peripheral port can alter the value read from a different peripheral port. A characteristic called "side-effects-of-writing." For example, before reading the counter's value from ICU 24, it is first necessary to freeze the value by writing to another control register. But, as explained above, CPU 10 can read the source operands for one instruction before writing the results of previous instruction unless the addresses indicate a dependency between the read and write references. Consequently, it is a requirement that read and write references to peripherals that exhibit side-effects-of-writing must occur in the order that instructions are executed.

CPU 10 supports two methods for handling memory-mapped I/O. The first method is more general; it satisfies both requirements listed above and places no restriction on the location of memory-mapped peripheral devices. The second method satisfies only the requirement for side effects of writing, and it restricts the location of memory-mapped I/O devices, but it is more efficient for devices that do not have destructive-read ports.

The first method for handling memory-mapped I/O uses two signals on the system interface. When CPU 10 generates a read bus cycle, it activates the output signal IOINH if either of the I/O requirements listed above is not satisfied. The input signal IODEC must be activated when the reference is to a peripheral device that implements ports with destructive-reading or side-effects of writing. When the CPU detects that the IOCEC input signal is active while the IOINH output signal is also active, it discards the data read during the bus cycle and serializes instruction. CPU 10 then generates the read bus cycle again, this time satisfying the requirements for I/O and driving IOINH inactive.

The second method for handling memory-mapped I/O uses a dedicated region of virtual memory. CPU 10 recognizes that virtual addresses between FF000000 (hex) and FFFFFFFF (hex), inclusive, are for memory-mapped I/O. While a write is pending to a location recognized to be memory-mapped I/O, CPU 10 delays reading from any location also recognized to be memory-mapped I/O. CPU 10 may, however, read from ordinary memory locations (those with an addresses less than FF000000 (hex)) while a write is pending to a memory-mapped I/O location. Similarly, CPU 10 may read from a memory-mapped I/O location while a write is pending to an ordinary memory location.

The techniques implemented by CPU 10 for detecting and handling memory-mapped I/O are described in copending and commonly-assigned U.S. patent application Ser. No. 006,012, "Method of Detecting and Handling Memory-Mapped I/O by a Pipelined Microprocessor", filed by Levy et al. of even date herewith, and which is hereby incorporated by reference.

After executing certain instructions or processing an exception, CPU 10 serializes instruction execution. Serializing instruction execution means that CPU 10 completes writing all previous instructions results to memory, then begins fetching and executing the next instruction. Thus, when a new value is loaded into the PSR by executing an LPR instruction, the new PSR value determines the privilege state (User Mode or Supervisor Mode) used to fetch and execute the next instruction.

CPU 10 serializes instruction execution after executing one of the following instructions: BICPSRW, BISPSRW, BPT, CINV, CIAG, FLAG (trap taken), LMR, LPR (CFG, INTBASE, PSR, UPSR, Debug Registers only), REIT, RETI, and SVC. LPR UPSR can be executed in the User Mode to serialize instruction execution. After an instruction that writes a result to memory is executed, the updating of the result's memory location may be delayed until the next serializing operation. When reset or a nonrestartable bus error exception occurs, CPU 10 discards any results that have not yet been written to memory.

As stated above, CPU 10 recognizes four types of exception: reset, bus errors, interrupts, and traps. When the CPU recognizes an exception, it saves the PC, PSR, and MOD contents, then transfers control to an exception service procedure.

A reset exception occurs when the $\overline{\text{RST}}$ signal is activated. Reset must be used at power-on to initialize CPU 10. When reset is recognized, the instruction being executed (if any) is terminated.

In response to a reset exception, CPU 10 stores the PC contents in the BPC register and the PSR contents in the less-significant word of the CAR, leaving the more significant word of the CAR undefined. Then the PC is cleared to 0, as are all the implemented bits in the PSR, FEW, and CFG registers. In addition the CEN-bit in the DCR is cleared to 0. After reset, the remaining implemented bits in the DCR and the contents of all other registers are undefined. CPU 10 begins executing the reset service procedure at location 0.

In response to bus errors, interrupts, and traps, CPU 10 performs similar sequences of operations. First, CPU 10 saves a copy of the current PSR by clearing certain control flags. Next, CPU 10 determines the vector number for the exception, which is used finally to call a service procedure through the Interrupt Dispatch Table.

Four signals are used to request that CPU 10 recognize an exception:

$\overline{\text{INT}}$-used to request a maskable interrupt;
$\overline{\text{NMI}}$-used to request a non-maskable interrupt;
$\overline{\text{DBG}}$-used to request a trap (DBG); and
$\overline{\text{RST}}$-used to reset CPU 10.

The $\overline{\text{INT}}$ signal is level-sensitive; a low on $\overline{\text{INT}}$ requests a maskable interrupt. $\overline{\text{INT}}$ can be asynchronous to CPU 10 timing; CPU 10 internally synchronizes the request. Nevertheless, if $\overline{\text{INT}}$ meets required setup and hold times, then CPU 10 recognizes the request deterministically. A maskable interrupt request must not be removed until it has been acknowledged.

The $\overline{\text{NMI}}$ signal is edge-sensitive; a high-to-low transition on $\overline{\text{NMI}}$ requests a nonmaskable interrupt. $\overline{\text{NMI}}$ can be asynchronous to CPU 10 timing; CPU 10 internally synchronizes the request. Nevertheless, if $\overline{\text{NMI}}$ meets the required setup and hold times, then CPU 10 recognizes the request deterministically.

The $\overline{\text{DBG}}$ signal is also edge-sensitive; a high-to-low transition on DBG requests trap (DBG). DBG can be asynchronous to CPU 10 timing; CPU 10 internally synchronizes the request. Nevertheless, if $\overline{\text{DBG}}$ meets the required setup and hold times, then CPU 10 will recognize the request deterministically.

The $\overline{\text{RST}}$ signal is level-sensitive; a low level on $\overline{\text{RST}}$ forces CPU 10 into the reset state and requests a reset exception. In order to reset CPU 10, $\overline{\text{RST}}$ must be held low for at least 100 clock (CLK) cycles; at power-on, $\overline{\text{RST}}$ must be held low for at least 50 microseconds after power has stabilized. While in the reset state, CPU 10 drives the following output signals inactive: $\overline{\text{ADS}}$, BE0–BE3. $\overline{\text{BMT}}$, $\overline{\text{CONF}}$ and $\overline{\text{HLDA}}$. The state of all of all other output signals is undefined.

$\overline{\text{RST}}$ is sampled synchronously by CPU 10 on the rising edge of the CLK signal. CPU 10 uses the low-to-high transition of $\overline{\text{RST}}$ to establish the phase relationship between CLK and BUSCLK.

The following discussions specifies how CPU 10 modifies the PSR contents to derive the saved and new PSR values for each exception cause, as well as how the vector number is determined.

A bus error exception occurs when the $\overline{\text{BER}}$ signal is activated in response to a data transfer or instruction fetch that is required to execute an instruction. CPU 10 does not respond to bus errors indicated for instructions that are not executed. (For example, no bus error exception occurs in response to activating the $\overline{\text{BER}}$ signal during a bus cycle to prefetch an instruction that is not executed because a previous instruction cause a trap.) If a bus error is indicated for a data transfer required by CPU 10 to process an exception, then CPU 10 enters the halted state.

The $\overline{\text{BER}}$ pin is sampled every transaction, at the end of T2. If CPU 10 detects a low level, it finishes the current memory transaction whether it is normal or a burst. If the bus error occurs during a bus cycle for a reference required to execute an instruction, then a bus error exception occurs.

CPU 10 distinguishes between two categories of bus error: restartable and nonrestartable. Restartable bus errors are recognized for read bus cycles on the system interface, except for certain references to read page table entries in order to translate the virtual address of a result being written to memory. Other bus errors are nonrestartable.

For restartable bus errors, the instruction being executed is suspended. In response to a restartable bus error, CPU 10 clears the P-flag in the current PSR before saving a copy and then forms a new PSR by clearing the T, V, U (User Mode), S (Stack), and I (Interrupt Enable) flags. The vector number for restartable bus errors is 11.

For nonrestartable bus errors, the instruction being executed (if any) is terminated. In response to a nonrestartable bus error, CPU 10 saves the current PSR and then forms a new PSR by clearing the T, V, U, S, P, and I flags. The vector number for nonrestartable bus errors is 12.

If external hardware latches the address and control signals associated with the last bus cycle that indicated an error on the system interface, then that information can be used by the service procedure for restartable bus errors to analyze and overcome the exception recognized by CPU 10.

To ensure coherency between the on-chip caches and external memory, the exception service procedure for a nonrestartable bus error must execute the CINV instruction to invalidate the contents of the on-chip Data Cache.

CPU 10 recognizes both nonmaskable and maskable interrupt requests. CPU 10 checks for enabled interrupt requests before executing each instruction and between iterations of a string instruction. CPU 10 recognizes a nonmaskable interrupt whenever the $\overline{\text{NMI}}$ signal is activated. CPU 10 recognizes a maskable interrupt when the $\overline{\text{INT}}$ signal is activated while the I-flag in the PSR is 1. Maskable interrupts are disabled while the I-flag is 0.

In response to a nonmaskable interrupt, CPU 10 saves a copy of the current PSR and then forms a new PSR by clearing the T, V, U, S, P, and I flags. CPU 10 then performs an Interrupt Acknowledged (Master) bus cycle on the system interface using address FFFFFE00 (hex), discarding the byte that is read during the bus cycle. The vector number for nonmaskable interrupts is 1.

The VI-bit in the CFG register controls whether maskable interrupts are handled in Vectored-Interrupt Mode (VI is 1) or Nonvectored-Interrupt Mode (VI is 0). In response to a maskable interrupt while in Nonvectored-Interrupt Mode, CPU 10 saves a copy of the current PSR and then forms a new PSR by clearing the T, V, L (Low), S, P (Trap Pending), and I flags. CPU 10 then performs an Interrupt Acknowledge (Master) bus cycle on the system interface using address FFFFFE00 (hex), discarding the byte that is read during the bus cycle. The vector number for nonvectored interrupts in 0.

While in Vectored-Interrupt Mode, CPU 10 responds to both cascaded and noncascaded interrupts requested by the Interrupt Control Unit 24. For both cascaded and noncascaded interrupts, CPU 10 first saves a copy of the current PSR and then forms a new PSR by clearing the T, V, L, S, P, and I flags. CPU 10 then performs an Interrupt Acknowledge (Master) bus cycle on the system interface using address FFFFFE00 (hex), reading a signed byte value.

If the byte read during the Interrupt Acknowledge (MAster) bus cycle is not negative, then the interrupt is noncascaded. The vector number for the interrupt is equal to the byte.

Otherwise, if the byte read during the Interrupt Acknowledge (Master) bus cycle is negative, then the interrupt is cascaded. CPU 10 reads the double-word Cascade Address for the cascaded ICU 24 location (INTBASE+4+byte). CPU 10 then performs an Interrupt Acknowledge (Cascaded) bus cycle on the system interface using the Cascade Address. The vector number for the interrupt is equal to the unsigned byte read during the Interrupt Acknowledge (Cascaded) bus cycle.

CPU 10 recognizes 11 trap conditions, as explained below.

1. Abort: An abort trap (ABT) occurs when an invalid PTE or a protection level error is detected for any of the memory references required to execute an instruction. The instruction being executed is suspended. In response to a trap (ABT), CPU 10 clears the P-flag in the current PSR before saving a copy and then forms a new PSR by clearing the T, V, U, S, and I flags. The vector number for trap (ABT) is 2.

2. Floating Point: A floating-point trap (FPU) occurs when the Floating-Point Unit 22 detects certain conditions while executing a floating-point instruction and activates the STRAP signal. The instruction being executed is suspended. In response to a trap (FPU), CPU 10 saves the current PSR and then forms a new PSR by clearing the T, V, L, S, and P flags. The vector number for trap (FPU) is 3. In systems that incorporate a Custom Slave Processor, a trap (FPU) also occurs when the slave activates the STRAP signal while executing a custom-slave instructor.

3. Illegal Operation: An illegal-operation trap (ILL) occurs when an attempt is made to execute a privileged instruction while in User Mode. The instruction being executed is suspended. In response to a trap (ILL), CPU 10 clears the P-flag in the current PSR before saving a copy and then forms a new PSR by clearing the T,V, U, and S flags, The vector number for a trap (ILL) is 4.

4. Supervisor Call: A supervisor-call trap (SVC) occurs when a Supervisor Call SVC instruction is executed. The SVC instruction is suspended. In response to trap (SVC), CPU 10 saves the current PSR and then forms a new PSR by clearing the T, V, L, S, and P flags. The vector number for trap (SVC) is 5, 5. Zero Divisor: A zero-divisor trap (DVZ) occurs when a Divide Extended Integer DEI, Divide DIVi, Quotient QUOi, or Remainder REMi instruction is executed and the source operand is 0. The instruction is suspended. In response to a trap (DVZ), CPU 10 saves the current PSR and then forms a new PSR by clearing the T, V, U, S, and P flags. The vector number for trap (DVZ) is 6.

6. Flag: A flag trap (FLG) occurs when a FLAG instruction is executed and the F-flag in the PSR is 1. The FLAG instruction is suspended. In response to a trap (FLG), CPU 10 saves the current PSR and then forms a new PSR by clearing the T, V, U, S, and P flags. The vector number for trap (FLG) is 7.

7. Breakpoint: A breakpoint trap (BPT) occurs when a Breakpoint BPT instruction is executed. The BPT instruction is suspended. In response to a trap (BPT), CPU 10 saves the current PSR and then forms a new PSR by clearing the T, V, U, S, and P flags. The vector number for trap (BPT) is 8.

8. Trace: A trace trap (TRC) occurs before an instruction is executed when the P-flag in the PSR is 1. In response to a trap (TRC), CPU 10 clears the P-flag in the current PSR before saving a copy and then forms a new PSR by clearing the T, V, L, and S flags. The vector number for trap (TRC) is 9.

9. Undefined Instruction: An undefined-instruction trap (UND) occurs when an attempt is made to execute an instruction and one or more of the following conditions is detected:
 (i) The instruction is undefined;
 (ii) The instruction is a floating-point instruction and the F-bit in the Configuration register is 0;
 (iii) The instruction is a memory-management instruction and the M-bit in the Configuration register is 0;
 (iv) The instruction is a custom instruction and the C-bit in the Configuration register is 0;
 (v) Immediate addressing mode is used for an operand that has access class different from read; or
 (vi) Scaled Indexing is used and the basemode is also Scaled Indexing.

The undefined instruction is suspended. In response to a trap (UND), CPU 10 clears the P-flag in the current PSR before saving a copy and then forms a new PSR by clearing the T, V, U, and S flags. The vector number for trap (UND) is 10.

10. Integer Overflow: An integer-overflow trap (CVF) occurs when the V-flag in the PSR is 1 and an integer-overflow condition is detected following execution of an instruction. Integer-overflow trap is disabled while the V-flag in the PSR is 0. More specifically, an integer-overflow condition is detected in the following cases:
 (i) The F-flag is 1 following execution of an Add ADDi, Add Quick Integer ADDQi, Add with Carry ADDCi, Subtract SUBi, Subtract with Carry SUBCi, Negate NEGi, Absolute Value ABSi, or Bounds Check CHECKi instruction;
 (ii) The product resulting for a MULi instruction cannot be represented exactly in the destination operand's location;
 (iii) The quotient resulting for a CEIi, DIVi, or QUOi instruction cannot be represented exactly in the destination operand's location;
 (iv) The result of an ASHi instruction cannot be represented exactly in the destination operand's location; or
 (v) The sum of the inc value and index operand for an ACBi instruction cannot be represented exactly in the index operand's location.

The instruction that caused the trap is completed. In response to a trap (CVF), CPU 10 saves the current PSR and then forms a new PSR by clearing the L, V, U, S, and P flags. The vector number for trap (CVF) is 13.

11. Debug: A debug trap (DBG) occurs when one or more of several conditions selected by the DCR is detected while executing an instruction or processing an exception. Trap (DBG) is enabled while the TR-bit in the DCR is 1; the trap is disabled while the TR is 0. If the trapping condition is detected while CPU 10 is executing an instruction, then the instruction is completed. In response to a trap (DBG), CPU 10 saves the current PSR and then forms a new PSR by clearing the T, V, U, S, P, and I flags. The vector number for trap (DBG) is 14.

After CPU 10 saved a copy of the PSR, formed a new PSR value and determined the vector number, a common sequence of operations is performed in response to all bus errors, interrupts, and traps. First the saved PSR copy along with the contents of the MOD and PC registers are pushed on the Interrupt Stack. Then CPU 10 reads the double-word entry from the Interrupt Dispatch Table (IDT) at address (INTBASE+vector+4). CPU 10 uses the IDT entry to call the exception service procedure, interpreting the entry either as a pointer or as an external procedure descriptor, depending on the DE-bit of the CFG register.

If DE is 1, then CPU 10 is in Direct-Exception Mode. The IDT entry is a pointer that is simply loaded into the PC.

The memory references and interrupt acknowledge bus cycles performed by CPU 10 while processing an exception may occur in any order, not only in the order described above.

While processing an exception, if a bus error or abort trap is detected, then CPU 10 halts until it is reset.

CPU 10 uses 2 bits in the PSR to enable and generate trace traps. While the T-flag is 1, instruction tracing is enabled. At the beginning of each instruction's execution, CPU 10 copies the T-flag to the P-flag. Before beginning the next instruction, CPU 10 checks the P-flag to determine whether a trap (TRC) is pending: If the P-flag is 1, then a trap (TRC) OCCURS.

The use of the T and P flags in this manner makes it possible for CPU 10 to generate a trap (TRC) after each executed instruction, and after other traps have been serviced. For example, if a trap (CVF) is recognized while instruction tracing is enabled, then the trap (TRC) occurs after the integer-overflow service procedure executes a return instruction at its conclusion. While the integer-overflow service procedure is executing, it can examine the PC value saved on top of the Interrupt Stack to determine the location of the instruction that caused the trap, without concern that instruction tracing was enabled.

The following privileged instructions cannot be reliably traced because they can alter the P-flag in the PSR during their execution: BICPSRW, BISPSRW, LPRi PSR, RETT, and RETI.

Because certain nonprivileged instructions, such as BICPSRB, can alter the T-flag during their execution, the trap (TRC) service procedure should ensure that the T-flag is set to 1 in the PSR copy saved on the Interrupt Stack before executing a return instruction at its conclusion in order to continue tracing instructions.

If instruction tracing is enabled while the WAIT instruction is executed, the trap (TRC) occurs after the next interrupt, when the interrupt service procedure has returned.

CPU 10 implements several features that assist in debugging. By appropriately programming the Debug Registers (DCR, BPC, and CAR), CPY can be made to recognize any of the following debug conditions:
1. The PC matches a specified value.
2. Selected bytes in memory have been read or written.
3. A selected register has been written.
4. The SDEG signal is activated.

CPU 10 recognizes four types of debug condition: address compare, PC match, register write, and external.

An address-compare condition is detected when certain memory locations are either read or written. The double-word address used for the comparison is specified in the CAR. The address-compare condition can be separately enabled for each of the bytes in the specified double-word, under control of the CBE-bits of the DOR. The VNP-bit in the DCR controls whether virtual or physical addresses are compared. The CRD and CWR bits in the DCR separately enable the address compare condition for read and written references; the CAE-bit in the DCR can be used to disable the compare-address condition independently from the other control bits. CPU 10 examines the address compare condition for all data reads and writes, reads of addresses for effective address calculations, MMU 18 references to PTEs, and memory references for exception processing.

The PC-match condition is detected when the address of the instruction equals the value specified in the BPC register. The PC-match condition is enabled by the PCE-bit in the DCR.

A register-write condition is detected when an instruction writes a result to the General-Purpose Register specified in the REG-field of the DCR. The register-write condition is enabled by the RE-bit in the DCR.

Detection of address-compare, PC-match, are register-write conditions is enabled for User and Supervisor Modes by the UD and SC bits in DCR. The DEN-bit can be used to disabled detection of these three conditions independently from the other control bits.

An external condition is recognized whenever the SDBG signal is activated.

When CPU 10 detects an address-compare, PC-match, or register-write condition while executing an instruction or processing an exception, then trap (DBG) occurs if the TR-bit in the DCR is 1. When an external debug condition is detected, trap (DPC) occurs regardless of the TR-bit. The cause of the trap (DBG) is indicated in the DSR.

When an address-compare or PC match condition is detected while executing an instruction, CPU 10 activates the BP signal after completing execution of the instruction; but if the instruction is not completed because a higher priority trap is detected, then CPU 10 does not activate the BP signal. If an address-compare condition is detected during processing of an exception, CPU 10 activates the BP signal before beginning to execute the next instruction.

While executing the MOVUS and MOVSU instructions, the compare-address condition is enabled for the User space memory reference order control of the VD-bit in the DCR.

When the LPRi instruction is executed to load a new value into the BPC, CAR or DCR, it is undefined whether the address-compare and PC-match conditions in effect while executing the instruction are detected under control of the old or new contents of the loaded register. Therefore, any LRPi instruction that alters the control of the address-compare or PC-match conditions should use register or immediate addressing mode for the source operand.

The Debug Registers are accessed using the PRi and SPRi instructions.

The Debug Condition register (DCR) enables detection of the debug conditions. The format of the DCR is shown in Table 17 below; the various fields are explained below:

CBE0 Compare Byte Enable 0; while 1, then BYTE0 of an aligned double-word is included in the address comparison CBE1 Compare Byte Enable 1; while 1, then BYTE1 of an aligned double-word is included in the address comparison CBE2 Compare Byte Enable 2; while 1, then BYTE2 of an aligned double-word is included in the address comparison CBE3 Compare Byte Enable 3; while 1, then BYTE3 of an aligned double-word is included in the address comparison VNP Compare virtual address (VNP=1) or physical address (VNP=0)

CWR Address-compare enable for write references

CRO Address-compare enable for read references

CAE Address-compare enable

REG Register number for register-write condition

TR Enable trap (DBG) when debug condition detected

PCE PC-match enable

RE Register-write enable

UD Enable debug conditions in User Mode
SD Enable debug conditions in Supervisor Mode
DEW Enable debug conditions
BF Bus interface unit FIFO disable. This bit controls a testing features that can aid initial system debugging by allowing all references, including Data Cache hits, to appear on the system interface. For normal operation, this bit should be 0. Refer to—Heading id "testapp" unknown—for more information.
SI Single-Instruction mode enable. This bit controls a testing features that can aid initial system debugging by inhibiting overlapped execution of instructions. For normal operation, this bit should be 0. Refer to—Heading id "testapp" unknown—for more information.
BCP Branch Condition Prediction disable. This bit controls a testing features that can aid initial system debugging by disabling the prediction of branch conditions. For normal operation, this bit should be 0. Refer to—Heading id "testapp" unknown—for more information.

TABLE 17

| 7 | 6 | 5 | 4 | 3 | 2 | 1 | 0 |
|---|---|---|---|---|---|---|---|
| CAE | CRD | CWR | VNP | CBE3 | CBE2 | CBE1 | CBE0 |

| 15 | | | | 10 | 9 | 8 |
|---|---|---|---|---|---|---|
| reserved | | | | BCP | SI | BF |

| 23 | 21 | 20 | 19 | | 16 |
|---|---|---|---|---|---|
| reserved | | TR | res | REGISTER NUMBER | |

| 31 | 30 | 29 | 28 | 27 | 28 | 24 |
|---|---|---|---|---|---|---|
| DEN | SD | UD | RE | PCE | reserved | |

The Debug Status Register (DSR) indicates debug conditions that have been detected. When CPU 10 detects an enabled debug condition, it sets the corresponding bit (BPC, BRW, BEX, BCA) in the DSR to 1. When an address-compare condition is detected, then the RD-bit is loaded to indicate whether a read or write reference was performed. Software must clear the BPC, BRW, EEX, and BCA bits in the DSR when appropriate. The format of the DSR is shown in Table 18 below; the various fields are explained below.
RD Indicates whether last address-compare condition was for a read (RD=1) or write (RD=0) reference
BPC PC-match condition detected
BRW Register-write condition detected
BEX External condition detected
BCA Address-compare condition detected

TABLE 18

| 4 | 3 | 2 | 1 | 0 |
|---|---|---|---|---|
| RD | BPC | BRW | BEX | BCA |

The Compare Address Register (CAR) contains the address that is compared with reference addresses to detect an address-compare condition. The address must be double-word aligned; that is, the 2 least-significant bits must be 0. The CAR is 32 bits.

The Breakpoint Program Counter (BPC) contains the address that is compared with the PC contents to detect a PC-match condition. The BPC is 32 bits.

CPU 10 checks for specific exceptions at various points while executing an instruction. It is possible that several exceptions may occur simultaneously. In that event, CPU 10 responds to the exception with highest priority.

Whenever a reset exception is detected, CPU 10 responds immediately. Any instruction being executed is terminated; any results that have not yet been written to memory are discarded; and any pending bus errors, interrupts, and traps are eliminated. The internal latches for the edge-sensitive signals on the system interface (NMI and SDBG) are cleared.

Whenever a nonrestartable bus error is detected but reset is not, CPU 10 responds immediately. Any instruction being executed is terminated; any results that have not yet been written to memory are discarded; and any pending traps other than trap (DBG) for external condition are eliminated. The internal latches for the edge-sensitive signals on the system interface (NMI and SDBG) are unaffected.

Before executing an instruction, CPU 10 checks for pending trap (DBG), interrupts, and trap (TRC), in that order. If a trap (DBG) is pending, then the CPL processes that exception. Otherwise, CPU 10 checks for pending interrupts. At this point, CPU 10 responds to any pending interrupt requests; nonmaskable interrupts are recognized with higher priority than maskable interrupts. If no interrupts are pending, then CPU 10 checks the P-flag in the PSR to determine whether a trap (TRC) is pending. If the P-flag is 1, then CPU 10 clears the P-flag and processes a trap (TRC).

If no trap (DBG), interrupt, or trap (TRC) is pending, then CPU 10 copies T to P in the PSR and begins executing the instruction. While executing an instruction, CPU 10 may detect up to three exceptions:
1. trap (ABT)
2. restartable bus error
3. one of 7 mutually exclusive traps: FPU, ILL, SVC, DVZ, FLG, BPT, UND Trap (ABT) and restartable bus error have equal priority; CPU 10 responds to the first detected trap (ABT) or restartable bus error. If a restartable bus error, trap (ABT), trap (ILL), or trap (UND) is detected, then the P-flag in the PSR is cleared, the instruction is suspended, and the exception is processed. If one of the other 5 trap conditions listed above (FPU, SVC, DVZ, FLG and BPT) is detected, then the instruction is suspended, and the corresponding trap is processed.

If no exception is detected while the instruction is executing, then the instruction is completed and the PC is updated to point to the next instruction. If a trap (OVF) is detected, then it is processed at this time.

While executing the instruction, CPU 10 checks for enabled debug conditions. If an enabled address-compare, PC-match, or register-write debug condition is detected, then a trap (DBG) is held pending until after the instruction is completed. But if another exception is detected before the instruction is completed, then the pending trap (DBG) is eliminated, and the DSR is unaffected.

For restartable bus errors and traps other than DBG, TRC, and OVF, the PC value saved on the Interrupt Stack is the address of the instruction that caused the exception. For interrupts, trap (DBG), trap (TRC), and trap (OVF), the PC value saved on the Interrupt Stack is the address of the next instruction to execute. For reset and nonrestartable bus errors, the PC value saved is undefined.

If an attempt is made to execute a privileged custom instruction while in User-Mode and the 0-bit in the CFG register is 0, then trap (UND) occurs.

If an attempt is made to execute a memory-management instruction while in User-Mode and the M-bit in the CFG register is 0, then trap (UND) occurs.

Trap (DBG) can be detected simultaneously with trap (OVF). In this event, the trap (OVF) is processed before the trap (DBG).

Following execution of the WAIT instruction, a trap (DBG) can be pending for a PC-match condition. In such an event, the trap (DBG) is processed immediately. However, if only a PC-match condition is detected, then the trap (DBG) occurs after the next interrupt, when the interrupt service procedure has returned.

An address-compare debug condition can be detected while processing a bus error, interrupt, or trap. In this case, the trap (DBG) is held pending until after CPU 10 has processed the first exception.

To execute a string instruction, CPU 10 iterates a sequence of operations to read source operands, calculate results, and write results operands. The iterations continue until a specified condition is detected or the strings have been completely processed.

While executing a string instruction, CPU 10 checks for trap (ABT) and restartable bus errors during each iteration. Trap (ABT) and restartable bus error have equal priority; CPU 10 responds to the first detected trap (ABT) or restartable bus error. Between iterations of a string instruction, CPU 10 checks for pending trap (DBG), nonmaskable interrupt, and maskable interrupt, in descending priority.

If a trap (ABT), restartable bus error, trap (DBG), or interrupt is detected while executing a string instruction, then the instruction is partially completed. Before processing the exception, the P-flag in the PSR is cleared. The PC value saved on the Interrupt Stack is the address of the string instruction.

CPU 10 may not check for register-write debug condition on each iteration of a string instruction. Therefore, if a register-write condition is enabled for one of the registers modified by a string instruction, then it is undefined whether the trap (DBG) will be recognized until after the instruction has completed.

If a PC-match debug condition is detected while executing a string instruction, then trap (DBG) is held pending until the instruction has completed.

After CPU 10 processes an exception, control is transferred to the appropriate exception service procedure. The service procedure begins executing in Supervisor Mode using the Interrupt Stack. Trap (TBC) and trap (OVF) are disabled. Maskable interrupts are also disabled for a service procedure called in response to an interrupt, bus error, or trap (ABT).

While Direct-Exception Mode is enabled, as explained above, then CPU 10 can respond more quickly to interrupts and other exceptions because fewer memory references are required to process an exception. But the MOD and SB registers are not initialized before CPU 10 transfers control to the service procedure. Consequently, the service procedure is restricted from executing any instructions, such as CXP, that use the contents of the MOD or SB registers in effective address calculations.

Service procedures perform actions appropriate for the type of exception recognized. At their conclusion, service procedures for nonmaskable interrupts, nonvectored interrupts, restartable bus errors, and traps execute a return instruction to resume executing instructions at the point where the exception was recognized. Service procedures for vectored interrupts execute the return instruction at their conclusion, as described below. Service procedures for reset and nonrestartable bus errors cannot resume executing instructions from the point where the exception was recognized.

The return instruction is executed at the conclusion of service for a vectored interrupt in order to inform external Interrupt Control Units that the interrupt's service is complete and to resume executing instructions at the point where the interrupt was recognized. At the end of executing the return instruction, CPU 10 performs an End-of-Interrupt (Master) bus cycle on the system interface using address FFFFFE00 (hex), reading a signal byte value. If the byte is not negative, then the interrupt was not cascaded, and execution of the instruction has completed. Otherwise, if the byte is negative, then the CPU reads the double-word Cascade Address from memory location (INTBASE*4*byte). CPU 10 then performs an End-of-Interrupt (Cascaded) bus cycle on the system interface using the Cascaded Address; the byte that is read during this bus cycle is discarded.

CPU 10 transfers data with other devices in the system using a bus composed of address, data, and control signals by performing a sequence of actions called a "bus cycle". DMA controllers can request control of the bus from CPU 10 in order to initiate their own data transfers. CPU 10 uses a 2-wire handshake to receive and acknowledge such bus requests.

CPU 10 receives and responds to external requests for exceptions, including interrupts, debug trap, and reset.

CPU 10 also displays information concerning its internal activity, such as whether it is operating in User or Supervisor Mode.

In addition interface of CPU 10 includes several signals dedicated for testing functions.

CPU 10 supports the use of external cache memories. The CI-bit from the level-2 Page Table Entries is presented on the CIC output signal during a bus cycle along with the address, allowing individual pages to be selectively externally cached. CPU 10 can also be made to retry a bus cycle by asserting the BRT input signal during the bus cycle. Before trying the bus cycle again, CPU 10 releases the bus, thereby allowing an external cache to handle misses by performing accesses to main memory.

The retry mechanism is used to restart the last memory cycle. Upon detecting the activation of the BRT pin, CPU 10 suspends the next memory cycle and prepares to restart the last one. Between these cycles, CPU 10 enters the idle stable for the duration of one clock cycle. The retry may occur on any memory access transaction and must be asserted at the end of T2.

As long as the BRT pin is active, CPU 10 will be in tri-state.

During a burst cycle, retry can be detected on each group of the data transfer. Upon detecting retry on a burst transfer, CPU 10 loads the correct address on the address bus and performs a burst data transaction until the end od its original burst request. The burst will not start again from the beginning, but rather exactly at the retry point.

It should be understood that various alternatives to the embodiment shown herein may be employed in practicing the present invention. It is intended that the following claims define the invention, and the structure and methods within the scope of these claims and their equivalents be covered thereby.

What is claimed is:

1. A method of prechecking the validity of a write access request from a microprocessor to a system memory for a result data character prior to execution of an instruction that generates the result data character, wherein the microprocessor includes a multi-stage instruction execution pipeline having an execution unit for calculating result data characters for a first instruction, an address unit for calculating the addresses and reading source operands for a second instruction, and a loader for decoding a third instruction and prefetching a fourth instruction, and wherein the microprocessor further includes a plurality of write access request sources for generating write access requests, the write access request sources including the execution unit and the address unit of the multi-stage instruction execution pipeline, and wherein the microprocessor further includes a memory management unit for arbitrating simultaneous write access requests by two or more of the write access request sources and for converting virtual addresses to physical addresses, the system memory being accessed by physical addresses applied to the system memory, the microprocessor further including a bus interface unit connected between the memory management unit and the system memory for providing physical addresses generated by the memory management unit to the system memory, the memory management unit being connected to each of the plurality of write access request sources via an internal bus for receiving write access requests and virtual addresses from the write access request sources, the write access request validity prechecking method comprising the sequential steps of:

issuing a probe write access request for a selected instruction from the address unit to the memory management unit and saving the virtual write address associated with the selected instruction;

upon acknowledgement by the memory management unit of the probe write access request, providing the virtual write address to the memory management unit;

utilizing the memory management unit for translation of the virtual write address to a corresponding physical address;

determining if write permission to the system memory exists for the physical address, and if write permission exists, asserting a valid signal, and if write permission does not exist, asserting a stop signal;

initiating execution of the selected instruction in the execution unit, and, if the stop signal is asserted, suspending execution of the selected instruction, and, if the valid signal is asserted, completing execution of the selected instruction to generate the result data character;

storing the result data character to a write buffer included in the execution unit;

issuing a write access request from the execution unit to the memory management unit for the result data character stored in the write buffer;

upon acknowledgement by the memory management unit of the write access request, providing the physical address to the system memory and writing the result data character to the system memory at the physical address.

2. A method as in claim 1 wherein, in the event that issuance of the probe write access request does not result in assertion of the valid signal, generating periodic subsequent probe write access requests until a subsequent probe write access request results in acknowledgement of said subsequent probe write access request and in assertion of the valid signal.

3. A method as in claim 1 wherein, upon simultaneous receipt by the memory management unit of a plurality of write access requests including a probe write access request from the address unit when the write buffer is full, granting priority to said probe write access request such that the valid signal is asserted.

* * * * *

UNITED STATES PATENT AND TRADEMARK OFFICE
CERTIFICATE OF CORRECTION

PATENT NO. : 5,438,670
DATED : August 1, 1995
INVENTOR(S) : GIGI BAROR ET AL.

It is certified that error appears in the above-indentified patent and that said Letters Patent is hereby corrected as shown below:

On the title page, item no. 75, please correct the last name of the inventor, ALON SHACKAM to read ALON SHACHAM.

Signed and Sealed this

Twenty-fourth Day of October, 1995

Attest:

BRUCE LEHMAN

*Attesting Officer*  *Commissioner of Patents and Trademarks*